(12) United States Patent
Golubchik

(10) Patent No.: US 12,422,525 B2
(45) Date of Patent: Sep. 23, 2025

(54) MULTIPLE COHERENT BEAM COMBINATION SYSTEMS SHARING A COMMON RECEIVER

(71) Applicant: RAFAEL ADVANCED DEFENSE SYSTEMS LTD., Haifa (IL)

(72) Inventor: Daniel Golubchik, Kiryat Bialik (IL)

(73) Assignee: RAFAEL ADVANCED DEFENSE SYSTEMS LTD., Haifa (IL)

( * ) Notice: Subject to any disclaimer, the term of this patent is extended or adjusted under 35 U.S.C. 154(b) by 386 days.

(21) Appl. No.: 18/024,992

(22) PCT Filed: Aug. 8, 2021

(86) PCT No.: PCT/IB2021/057303
§ 371 (c)(1),
(2) Date: Mar. 7, 2023

(87) PCT Pub. No.: WO2022/049431
PCT Pub. Date: Mar. 10, 2022

(65) Prior Publication Data
US 2024/0012113 A1   Jan. 11, 2024

(30) Foreign Application Priority Data
Sep. 7, 2020   (IL) .......................................... 277192

(51) Int. Cl.
*G01S 7/481* (2006.01)
*G01S 7/497* (2006.01)
(Continued)

(52) U.S. Cl.
CPC .......... *G01S 7/4816* (2013.01); *G01S 7/4815* (2013.01); *G01S 7/497* (2013.01); *G01S 17/86* (2020.01);
(Continued)

(58) Field of Classification Search
CPC ........ G01S 7/4816; G01S 7/86; G01S 7/4815; G01S 7/497; G02B 23/04; G02B 26/0833;
(Continued)

(56) References Cited

U.S. PATENT DOCUMENTS

| 2005/0135815 A1* | 6/2005 | Gerwe | H01S 3/2383 |
| | | | 398/188 |
| 2007/0086010 A1* | 4/2007 | Rothenberg | H01S 3/1301 |
| | | | 356/450 |

(Continued)

FOREIGN PATENT DOCUMENTS

| JP | 2012004311 A | 1/2012 |
| JP | 2014216418 A | 11/2014 |
| WO | 2020016824 A1 | 1/2020 |

OTHER PUBLICATIONS

International Search Report for PCT/IB2021/057303 Mailed on Nov. 17, 2021.

(Continued)

*Primary Examiner* — Sharrief I Broome
(74) *Attorney, Agent, or Firm* — Rivka Friedman

(57) ABSTRACT

A targeting receiver operates with beam emitters. Each emitter generates coherent beams directed towards a target as a composite beam having an associated signature. For each composite beam, the target reflects a proportion of radiation intensity as a reflected radiation component. A receiver telescope collects target-reflected radiation and directs the radiation to a spatial filter. The reflected radiation includes radiation components, at least some of which are combined as a combined radiation composed of the reflected radiation components. Intensity of the combined radiation indicates the intensity of the composite beams impinging on the target. The spatial filter filters the reflected radiation by selectively passing the combined radiation. Each component (Continued)

of the combined radiation is identifiable by the signature associated with the composite beam corresponding to the component of the combined radiation. In certain embodiments, a distinguishing module is associated with the receiver and distinguishes the components based on the signature.

14 Claims, 9 Drawing Sheets

(51) Int. Cl.
  *G01S 17/86* (2020.01)
  *G02B 23/04* (2006.01)
  *G02B 26/08* (2006.01)
  *G02B 27/00* (2006.01)
  *G02B 27/10* (2006.01)
  *G02B 27/14* (2006.01)

(52) U.S. Cl.
  CPC ......... *G02B 23/04* (2013.01); *G02B 26/0833* (2013.01); *G02B 27/0068* (2013.01); *G02B 27/1013* (2013.01); *G02B 27/141* (2013.01)

(58) Field of Classification Search
  CPC ............ G02B 27/0068; G02B 27/1013; G02B 27/141
  USPC ......................................................... 359/269
  See application file for complete search history.

(56) References Cited

U.S. PATENT DOCUMENTS

2009/0185176 A1* 7/2009 Livingston ............ H01S 3/1305
                                                    356/237.2
2011/0176565 A1   7/2011 Hutchin
2012/0292481 A1* 11/2012 Hutchin .................. G01S 17/89
                                                    250/214 R
2014/0231618 A1*  8/2014 Beresnev ........... G02B 27/0087
                                                    250/201.9
2021/0294109 A1*  9/2021 Golubchik .............. G01S 7/497

OTHER PUBLICATIONS

Israel Office Action for IL 277192 Mailed on Jul. 5, 2021.
Israeli Office Actin for IL 277192 Mailed on Apr. 13, 2022.
Japanese Office Action for JP 2023515080 Mailed on Aug. 20, 2024.
Extended European Search Report for EP21863781.7 Mailed on Oct. 9, 2024.
Xinyang Li et al. "Coherent beam combining of collimated fiber array based on target-in-the-loop technique", Proceedings of SPIE, Nov. 2011, vol. 8178, Article. 8178M, DOI: 10.1117/12.897153, <URL: https://www.spiedigitallibrary.org/conference-proceedings-of-spie/8178/81780 M/Coherent-beam-combining-of-collimated-fiber-array- based-on-target/10.1117/12.897153.full >.
Yanxing Ma et al., "Target-in-the-loop coherent beam combination of 100 W level fiber laser array based on an extended target with a scattering surface" Optics Letters and Optical Society of America, Apr. 1, 2013, vol. 38, No. 7, pp. 1019-1021, DOI: 10.1364/OL.38.001019, <URL: https://opg.optica.org/ol/fulltext.cfm?uri=ol-38-7-1019>.

* cited by examiner

MULTIPLE COHERENT BEAM COMBINATION SYSTEMS SHARING A COMMON RECEIVER

TECHNICAL FIELD

The present invention relates to Coherent Beam Combination (CBC) systems.

BACKGROUND OF THE INVENTION

It is known to employ CBC systems in which a plurality of coherent laser beams are combined to form output beams in order to achieve power scaling of a laser source. In order to provide system flexibility in terms of the number and allocation of beam sources, directing the output beams from multiple CBC systems so as to combine at a target as a combined beam has been contemplated. Coherent combining of the output beams from multiple CBC systems poses technological challenges without significant benefit. In particular, because of the coherence between the output beams of the CBC systems, the resulting interference pattern of the combined beam—typically used for beam intensity optimization in combination with target imaging—consists of dense lines, which makes stabilization of the combined beam on the target exceedingly difficult. Furthermore, coherent combining of the output beams on the target requires individual measurement of each of the sub-beams of the CBC systems in order to achieve intensity optimization of the individual output beams. Similar challenges exist when the output beams from multiple CBC systems are incoherently combined.

SUMMARY OF THE INVENTION

The present invention is a system and method for receiving radiation reflected from a target in response to illumination of the target by a plurality of beam emitters using a common receiver.

According to the teachings of an embodiment of the present invention, there is provided a system comprising: a plurality of beam emitting subsystems, each beam emitting subsystem configured to generate a plurality of coherent beams for directing towards an area of a target so as to combine at or before the target as a composite output beam, for each composite output beam a proportion of radiation intensity of the composite output beam reflected by the target as a reflected radiation component; a telescope arrangement for collecting radiation reflected from the target and directing the reflected radiation onto a focal plane, the reflected radiation including a plurality of components of radiation, at least some of the components of radiation combining as a combined radiation composed of the reflected radiation components, and an intensity of the combined radiation indicative of radiation intensity of the composite output beams impinging on the target; a spatial filtering configuration deployed at the focal plane and configured for filtering the reflected radiation by selectively passing the combined radiation; and a radiation distinguishing module for receiving the combined radiation passed by the spatial filtering configuration and for distinguishing, for each reflected radiation component, an intensity parameter of the reflected radiation component from an intensity parameter of the combined radiation of all other of the reflected radiation components.

According to a further feature of an embodiment of the present invention, each beam emitting subsystem includes: a beam generating arrangement for generating a respective one of the composite output beams, and a beam directing arrangement for directing the composite output beam towards the target.

According to a further feature of an embodiment of the present invention, each reflected radiation component has a different wavelength from all other of the reflected radiation component, and the radiation distinguishing module includes: an optics arrangement including at least one dispersive optical component for separating the combined radiation into a plurality of constituent wavelengths corresponding to the wavelengths of the reflected radiation component, and a detector arrangement for receiving radiation separated by the at least one dispersive optical component, the detector arrangement configured to separately measure radiation at each respective wavelength of the constituent wavelengths.

According to a further feature of an embodiment of the present invention, the at least one dispersive optical component includes a prism.

According to a further feature of an embodiment of the present invention, the at least one dispersive optical component includes a diffractive grating.

According to a further feature of an embodiment of the present invention, the optics arrangement further includes a collimating element deployed in an optical path between the spatial filtering configuration and the at least one dispersive optical component, the collimating element configured for: collimating the combined radiation so as to produce collimated radiation, and directing the collimated radiation to the at least one dispersive optical component.

According to a further feature of an embodiment of the present invention, the detector arrangement includes an array of detectors, each respective detector of the array of detectors configured to measure radiation in a different respective wavelength of the constituent wavelengths.

According to a further feature of an embodiment of the present invention, each beam emitting subsystem includes: an array of beam sources configured to generate a plurality of coherent beams for directing towards the target so as to combine at or before the target as the composite output beam, a plurality of adjustable phase modulators associated with the beams sources so as to allow adjustment of relative phase offsets of the coherent beams, and an encoding module for encoding a phase of each of the coherent beams with a code that is locally unique to the beam emitting subsystem.

According to a further feature of an embodiment of the present invention, the radiation distinguishing module includes: a detector deployed to receive the combined radiation and to monitor an intensity parameter of the combined radiation, and a decoding module configured to decode, for each composite output beam, the intensity parameter of the combined radiation according to the locally unique code of the beam emitting subsystem that generated the composite output beam to isolate an intensity parameter of the reflected radiation component corresponding to the composite output beam.

According to a further feature of an embodiment of the present invention, the encoding module includes a modulator, and the code includes a modulation frequency such that each composite output beam is assigned at least one unique modulation frequency, and the encoding module configured to encode the phase of each of the coherent beams for each beam emitting subsystem by modulating the current phase of the coherent beams at the assigned at least one modulation frequency, and the decoding module includes a plurality of demodulators, each demodulator configured to demodulate the signal at one or more selected demodulation frequency selected from the assigned unique modulation frequencies.

According to a further feature of an embodiment of the present invention, there is also provided a control subsystem associated with the radiation distinguishing module and each of the beam emitting subsystems, and each beam emitting subsystem includes: an array of beam sources configured to generate a plurality of coherent beams for directing towards the target so as to combine at or before the target as the composite output beam, and a plurality of adjustable phase modulators associated with the beams sources so as to allow adjustment of relative phase offsets of the coherent beams, and for each reflected radiation component the control subsystem is configured to: receive the intensity parameter of the reflected radiation component from the radiation distinguishing module, and adjust a beam parameter of one or more coherent beams of the composite output beam corresponding to the reflected radiation component based on the received intensity parameter.

According to a further feature of an embodiment of the present invention, there is also provided an imaging system for generating images of the target, the imaging system including: a wavefront sensor, a deformable mirror for receiving radiation from the spatial filtering configuration, a beam splitter for receiving radiation from the deformable mirror and providing a part of the received radiation to the wavefront sensor and providing another part of the received radiation to the radiation distinguishing module, and an adaptive optics controller associated with the wavefront sensor operative to control the deformable mirror so as to reduce optical distortions in the reflected radiation collected by the telescope arrangement.

There is also provided according to the teachings of an embodiment of the present invention, a system comprising: a plurality of beam emitting subsystems, each beam emitting subsystem including an array of beam sources configured to generate a plurality of coherent beams for directing towards an area of a target so as to combine at or before the target as a composite output beam, the composite output beams generated by the beam emitting subsystems having different respective wavelengths, and for each composite output beam a proportion of radiation intensity of the composite output beam reflected by the target as a reflected radiation component; and a receiver including: a telescope arrangement for collecting radiation reflected from the target and directing the reflected radiation onto a focal plane, the reflected radiation including a plurality of components of radiation, at least some of the components of radiation combining as a combined radiation composed of the reflected radiation components, a spatial filtering configuration deployed at the focal plane and configured for filtering the reflected radiation by selectively passing the combined radiation, an optics arrangement for receiving the combined radiation from the spatial filtering configuration and including at least one dispersive optical component for separating the combined radiation into a plurality of constituent wavelengths corresponding to the wavelengths of the composite output beams, and a detector arrangement for receiving radiation separated by the at least one dispersive optical component, the detector arrangement configured to separately measure radiation at each respective wavelength of the constituent wavelengths.

According to a further feature of an embodiment of the present invention, the at least one dispersive optical component includes a prism.

According to a further feature of an embodiment of the present invention, the at least one dispersive optical component includes a diffractive grating.

According to a further feature of an embodiment of the present invention, the optics arrangement further includes a collimating element deployed in an optical path between the spatial filtering configuration and the at least one optical component, the collimating element configured for: collimating the combined radiation so as to produce collimated radiation, and directing the collimated radiation to the at least one optical element.

According to a further feature of an embodiment of the present invention, there is also provided a control subsystem associated with the detector arrangement and each of the beam emitting subsystems, and for each beam emitting subsystem the control subsystem is configured to adjust a beam parameter of one or more coherent beams of the composite output beam generated by the beam emitting subsystem, based on the measured radiation by the detector arrangement.

According to a further feature of an embodiment of the present invention, the detector arrangement includes an array of detectors, each respective detector of the array of detectors configured to measure radiation in a different respective wavelength of the constituent wavelengths.

There is also provided according to the teachings of an embodiment of the present invention, a system comprising: a plurality of beam emitting subsystems, each beam emitting subsystem including: an array of beam sources configured to generate a plurality of coherent beams for directing towards an area of a target so as to combine at or before the target as a composite output beam, a proportion of radiation intensity of the composite output beam reflected by the target as a reflected radiation component, a plurality of adjustable phase modulators associated with the beam sources so as to allow adjustment of relative phase offsets of the coherent beams, and an encoding module for encoding a phase of each of the coherent beams with a code that is locally unique to the beam emitting subsystem; and a receiver including: a telescope arrangement for collecting radiation reflected from the target and directing the reflected radiation onto a focal plane, the reflected radiation including a plurality of components of radiation, at least some of the components of radiation combining as a combined radiation composed of the reflected radiation components, a spatial filtering configuration deployed at the focal plane configured for filtering the reflected radiation by selectively passing the combined radiation, a detector deployed to receive the combined radiation from the spatial filtering configuration and to generate a signal representative of an intensity of the combined radiation, and a decoding module for decoding the signal according to the locally unique code for each beam emitting subsystem.

According to a further feature of an embodiment of the present invention, the encoding module includes a modulator, and each composite output beam assigned a locally unique modulation frequency, and for each beam emitting subsystem the modulator configured to modulate a current phase of the coherent beams at the assigned modulation frequency, and the decoding module includes a plurality of demodulators, each demodulator configured to demodulate the signal at one or more selected demodulation frequency selected from the assigned unique modulation frequencies.

According to a further feature of an embodiment of the present invention, for each beam emitting subsystem: the encoding module includes a sequence generator for generating a code sequence, and the encoding module configured to encode the phase of each of the coherent beams by modulating the current phase of the coherent beams with a waveform associated with the code sequence, and the decoding module includes a signal generator for generating the waveforms associated with the code sequences, and the decoding module configured to demodulate the signal using each of the waveforms.

There is also provided according to the teachings of an embodiment of the present invention, a system comprising: a plurality of beam emitting subsystems, each beam emitting subsystem configured to generate a plurality of coherent beams for directing towards an area of a target so as to combine at or before the target as a composite output beam, for each composite output beam a proportion of radiation intensity of the composite output beam reflected by the target as a reflected radiation component; a plurality of receivers, each of the receivers configured to: collect radiation reflected from the target and direct the reflected radiation onto a focal plane, the reflected radiation including a plurality of components of radiation, at least some of the components of radiation combining as a combined radiation composed of the reflected radiation components, and an intensity of the combined radiation indicative of radiation intensity of the composite output beams impinging on the target, spatially filter the reflected radiation at the focal plane by selectively passing the combined radiation, and receive the combined radiation that is spatially filtered and distinguish, for each reflected radiation component, an intensity parameter of the reflected radiation component from an intensity parameter of the combined radiation of all other of the reflected radiation components; and a control subsystem associated with the receivers and configured to: select a selected receiver based on an estimate of an effective resolution of the target provided by each of the receivers.

According to a further feature of an embodiment of the present invention, the control subsystem is further configured to actuate each of the beam emitting subsystems to adjust a beam parameter of one or more of the coherent beams based on the intensity parameters distinguished by the selected receiver.

There is also provided according to the teachings of an embodiment of the present invention, a method comprising: transmitting a plurality of composite output beams, each output beam transmitted by generating a plurality of coherent beams and directing the coherent beams towards an area of a target so as to combine at or before the target as the composite output beam, for each composite output beam a proportion of radiation intensity of the composite output beam reflected by the target as a reflected radiation component; collecting radiation reflected from the target and directing the reflected radiation onto a focal plane, the reflected radiation including a plurality of components of radiation, at least some of the components of radiation combining as a combined radiation composed of the reflected radiation components, and an intensity of the combined radiation indicative of radiation intensity of the composite output beams impinging on the target; spatially filtering the reflected radiation by selectively passing the combined radiation; and receiving the combined radiation passed by the spatial filtering configuration and distinguishing, for each reflected radiation component, an intensity parameter of the reflected radiation component from an intensity parameter of the combined radiation of all other of the reflected radiation components.

There is also provided according to the teachings of an embodiment of the present invention, a system comprising: a plurality of beam emitting subsystems, each beam emitting subsystem configured to generate a plurality of coherent beams for directing towards an area of a target so as to combine at or before the target as a composite output beam, each composite output beam having an associated locally unique signature, and for each composite output beam a proportion of radiation intensity of the composite output beam reflected by the target as a reflected radiation component; a telescope arrangement for collecting radiation reflected from the target and directing the reflected radiation onto a focal plane, the reflected radiation including a plurality of components of radiation, at least some of the components of radiation combining as a combined radiation composed of the reflected radiation components, and an intensity of the combined radiation indicative of radiation intensity of the composite output beams impinging on the target; and a spatial filtering configuration deployed at the focal plane and configured for filtering the reflected radiation by selectively passing the combined radiation, and each component of the combined radiation identifiable according to the locally unique signature associated with the composite output beam that corresponds to the component of the combined radiation.

According to a further feature of an embodiment of the present invention, there is also provided at least one radiation distinguishing module for receiving the combined radiation passed by the spatial filtering configuration and for distinguishing, for at least one of the reflected radiation components, an intensity parameter of the at least one of the reflected radiation components from an intensity parameter of the combined radiation of all other of the reflected radiation components, based on at least one of the locally unique signatures associated with the composite output beam that corresponds to the component of the combined radiation.

According to a further feature of an embodiment of the present invention, the at least one radiation distinguishing module includes exactly one radiation distinguishing module.

According to a further feature of an embodiment of the present invention, the at least one radiation distinguishing module includes a plurality of radiation distinguishing modules, each radiation distinguishing module associated with a respective one of the beam emitting subsystems, and for each radiation distinguishing module, the radiation distinguishing module configured to distinguish an intensity parameter of one of the reflected radiation components, corresponding to the composite output beam generated by the beam emitting subsystem associated with the radiation distinguishing module, from the intensity parameter of the combined radiation of all other of the reflected radiation components.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DESCRIPTION OF THE PREFERRED EMBODIMENTS

Figure 1:
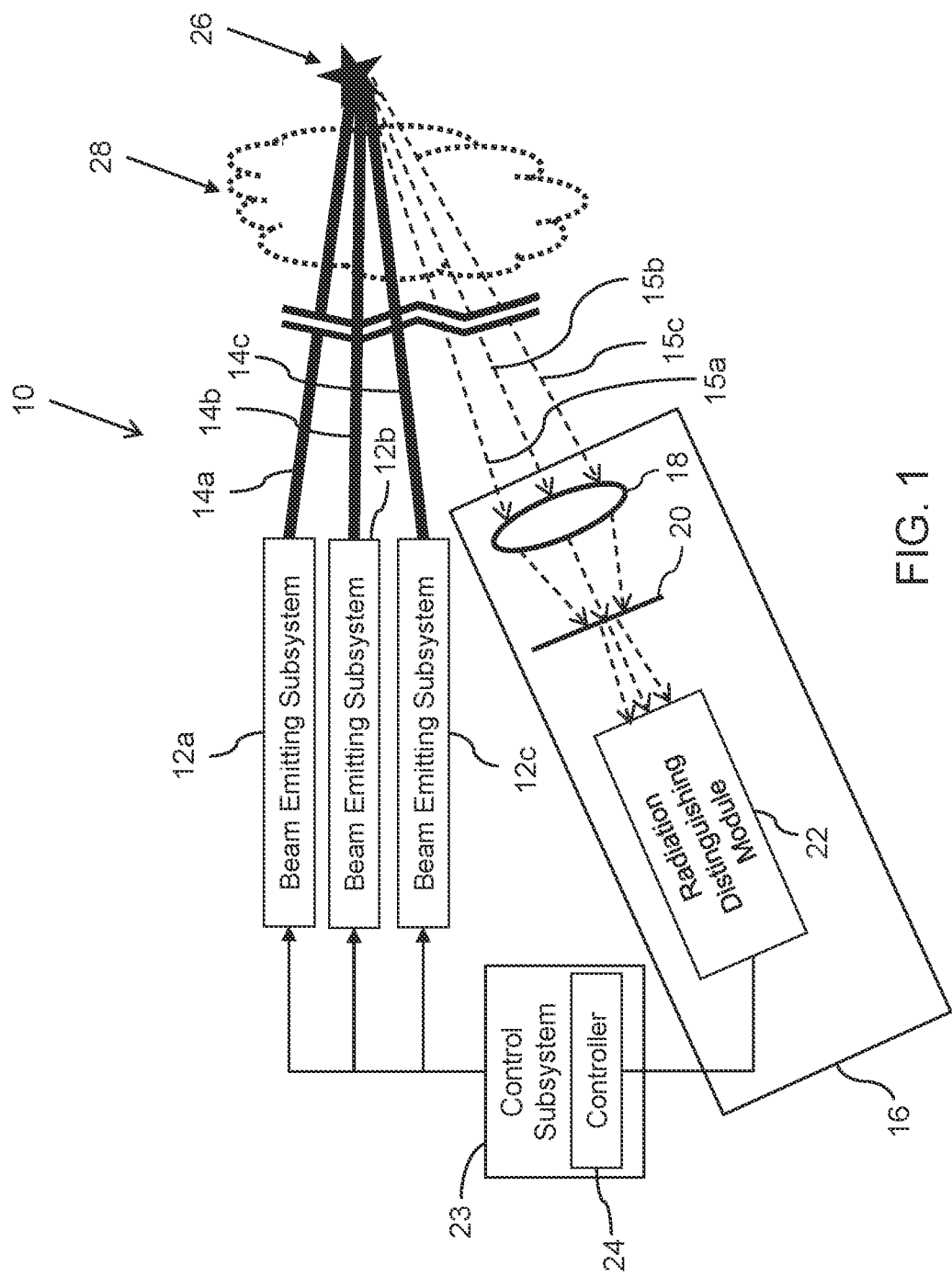
FIG. 1 is a schematic representation of a system, constructed and operative according to embodiments of the present invention, having a plurality of beam emitting subsystems for transmitting beams of radiation towards a target, and a single receiver shared amongst the beam emitting subsystems having a telescope for collecting corresponding reflected radiation from the target and a radiation distinguishing module for distinguishing components of the reflected radiation from other components of the reflected radiation.

The present invention is a system and method for receiving radiation reflected from a target in response to illumination of the target by a plurality of beam emitters using a common receiver.

The beam emitters are configured to illuminate a common spot on the target with each beam emitter transmitting coherent beams that coherently combine at or before reaching the target. The receiver is deployed and aimed at the target with a view of the spot, enabling capture of reflected radiation from the spot corresponding to the radiant illumination from all of the beam emitters, and in certain embodiments imaging of the spot. The receiver is typically smaller in size and of lower cost as compared to the beam emitters, and can be deployed independently from the beam emitters. Due to size, cost effectiveness, and deployment options of the receiver relative to the beam emitters, the system of the present disclosure provides significant advantages over conventional systems that employ a dedicated receiver for each CBC system. One particular advantage of using a single receiver with a multitude of beam emitters (including up to several hundreds of beam emitters) according to the embodiments of the present disclosure is the capability to aim the receiver at a target spot common to the beam emitters, capture target-reflected radiation from a corresponding number of coherently combined beams, and subsequently process the captured radiation to form images of the target spot and/or to use as input for other purposes, for example, as feedback to the beam emitters for beam intensity optimization. In certain embodiments, the reflected radiation is processed by a control subsystem and provided as feedback to the beam emitters for adjusting beam transmission parameters for beam intensity optimization. In order to enhance the efficacy with which the beam emitters perform intensity optimization, embodiments of the present disclosure process the reflected radiation so as to isolate radiation components in the reflected radiation that corresponds to beams transmitted by specific beam emitters. The radiation processing may be performed by the receiver itself, or may be performed by one or more modules that are separate from the receiver.

The principles and operation of the system and method according to present invention may be better understood with reference to the drawings accompanying the description.

The system and method according to the present invention is of particular value when applied within the context of high-energy laser or directed-energy weapons systems.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Referring now to the drawings, FIG. 1 illustrates an implementation of a multiple coherent beam combination (CBC) system (referred to hereinafter as "the system"), generally designated 10, constructed and operative according to certain non-limiting embodiments of the present disclosure. In general terms, the system 10 includes a battery (i.e., a set or group) of beam emitting subsystems 12a, 12b and 12c, configured to generate and transmit (direct) respective composite output beams 14a, 14b and 14c towards an area of a target 26 (typically a remote target), and a receiver 16 (also referred to as a targeting receiver) that is common among (i.e., shared between) all of the beam emitting subsystems 12a, 12b and 12c deployed to receive reflected radiation from the target 26.

The beam emitting subsystems 12a, 12b and 12c transmit the respective output beams such that the composite output beams 14a, 14b and 14c are incoherently combined at or before reaching the target 26. The composite output beams 14a, 14b and 14c (referred to interchangeably as "output beams", "composite beams", or "output composite beams") are transmitted along an optical path passing through an optically non-uniform and/or transiently varying medium 28, such as the atmosphere, towards the target 26. It is desirable that each of the composite output beams 14a, 14b and 14c impinge on the same area of the target 26 so as to be able to achieve efficient power scaling of the individual beam emitting subsystems 12a, 12b and 12c.

Various approaches to guiding beams from different (or the same) sources so as to combine on a common spot on a target with high precision have been presented. One approach uses a master-slave beam emitter configuration in which a master unit emits (transmits) a low-power guide beam onto the intended spot on the target, which forms a local coordinate system on the target. A slave unit tracks the spot of the guide beam on the target, calculates a direction vector (using, for example, the formed local coordinate system) from the slave unit to the target spot, and then transmits one or more high-power beams along the vector so as to combine on the intended target spot. Further details of a system that provides combining of beams (of generally lower power than the output beams 14a, 14b and 14c) on a target spot can be found in the applicant's commonly owned U.S. Pat. No. 9,003,942 B2, which is hereby incorporated by reference in its entirety herein. Although this prior approach relates to lower-power beams combining on a target, the general concept of such a system may be applicable in the context of the present invention. Here, a master unit may be deployed to transmit a low-power guide beam, and the beam emitting subsystems 12a, 12b and 12c may function as synchronized slave units that transmit high-power output beams 14a, 14b and 14c based on calculated direction vectors, where synchronization may be provided by a control subsystem linked to the beam emitting subsystems 12a, 12b and 12c and the master unit. Direction vector calculation may be performed by such a control subsystem, or may be performed by processing hardware/software locally installed on the beam emitting subsystems 12a, 12b and 12c.

The beam emitting subsystems 12a, 12b and 12c can be deployed in various deployment configurations, depending on the particular case in which the system 10 is to be used. In one non-limiting example configuration, the beam emitting subsystems 12a, 12b and 12c are deployed in close proximity to each other, preferably within a single modular housing. In another example configuration, the beam emitting subsystems 12a, 12b and 12c are deployed in an array with even or uneven spacing between adjacent beam emitting subsystems, and in which adjacent beam emitting subsystems can be between approximately 5-50 meters apart. In other configurations, the beam emitting subsystems 12a, 12b and 12c are strategically deployed in a disjoined (non-array) configuration, where adjacent beam emitting subsystems can be between up to several km apart, as long as the beam emitting subsystems 12a, 12b and 12c can each be aimed at the same point on the target 26.

Although three beam emitting subsystems are illustrated here for simplicity of presentation, the embodiments of the present disclosure may be implemented with an array containing anywhere between two and several hundreds of such subsystems.

Figure 2:
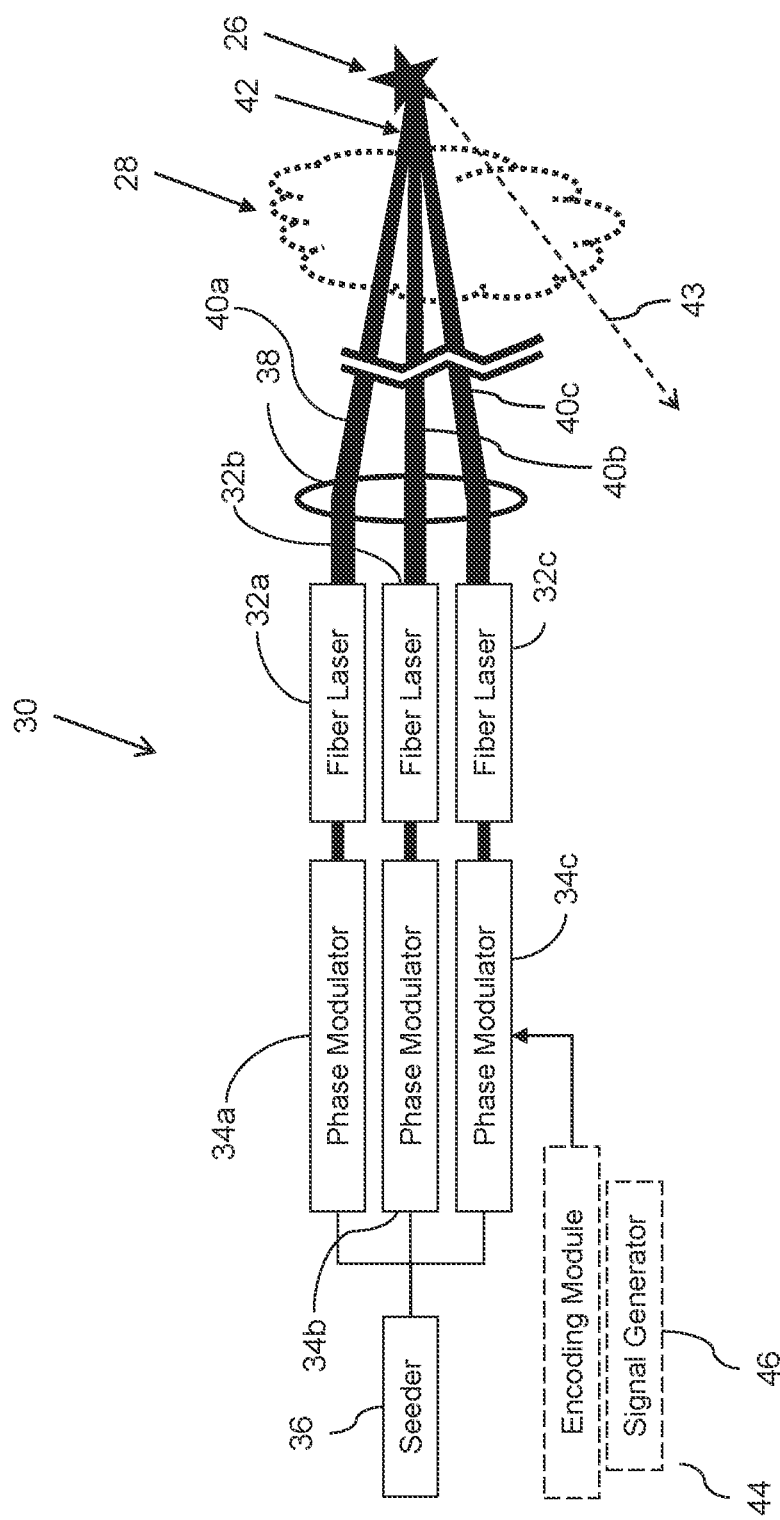
FIG. 2 is a schematic representation of a beam emitting subsystem that can be implemented in the system of FIG. 1 for transmitting the beams, according to embodiments of the present invention.

As will be discussed, each of the composite output beams 14a, 14b and 14c is formed from a plurality of respective coherent beams produced by associated beam sources by the respective beam emitting subsystem 12a, 12b and 12c. FIG. 2 schematically illustrates a non-limiting example of a beam emitting subsystem 30 which can be used to implement each of the beam emitting subsystems 12a, 12b and 12c. Generally speaking, the beam emitting subsystem 30 includes an array of beam sources 32a, 32b and 32c configured to generate a plurality of coherent beams 40a, and 40c (also referred to as "sub-beams") for directing towards the target 26. A plurality of adjustable phase modulators 34a, 34b and 34c are associated with respective beam sources 32a, 32b and 32c to allow adjustment of relative phase offsets of the beams. Although only three beam sources and phase modulators are illustrated in FIG. 2 for simplicity of presentation, the embodiments of the present disclosure are most preferably implemented with an array containing anywhere between two and a few hundred beams, and is most typically implemented with at least 10 beam sources, and in some particularly preferred cases, in the range of 15-40 beam sources. The phase modulators are typically provided one-per-source, although it will be appreciated that one of the sources may be implemented as a fixed reference phase without adjustment, and the rest of the beams and phase offsets may be measured and/or adjusted relative to that reference phase.

It will be understood that various details of the implementations of the system and the beam emitting subsystem 30 will vary considerably according to the intended application of the device. The variety of applications may extend from a low-energy research tool for measuring high-speed variations in optical properties of turbulent media through various communications applications (medium energy) up to high-energy directed-energy weapon systems. Although the beam emitting subsystem and by extension the system 10, supports a wide variety of applications, the beam emitting subsystem 30 and the system 10 are of particular value when used as part of a high-energy laser or directed-energy weapons system. In each case, the array of beam sources 32a, 32b and 32c is most preferably an array of fiber lasers, seeded by a common seeder oscillator 36. For high energy applications, each fiber laser is preferably rated for a power output of at least 100 W. The principles of the present embodiments may be used for devices operating with various different wavelengths, but is typically implemented in the near-infrared (NIR) range. Seeder oscillators and fiber lasers suitable for operating in these ranges are well known in the art, and are readily commercially available. The phase modulators 34a, 34b and 34c may be any type of phase modulator with suitable response times and low attenuation. The phase modulators are positioned after splitting the seeder 36, but preferably before the fiber lasers in order to operate with a relatively low-power signal. Suitable phase modulators are available commercially. One suitable non-limiting example is a 10 GHz titanium indiffused Z-Cut LiNbO3 phase modulator identified by model no. LN53S-FC commercially available from Thorlabs, NJ (USA). The combination of the beam sources 32a, 32b and 32c, the phase modulators 34a, 34b and 34c, and the seeder 36 constitute a "beam generating arrangement".

In certain embodiments, an encoding module 44 is linked to each of the phase modulators 34a, 34b and 34c. As will be discussed, the encoding module 44 is operative to encode (or "tag") the phase of the coherent beams with a code (or "signature") that is unique to the particular beam emitting subsystem (and the output beam transmitted by that beam emitting subsystem).

A beam directing arrangement (represented schematically in FIG. 2 by a lens 38) directs the beams 40a, 40b and 40c towards a particular region (area) of the target 26 such that the beams 40a, 40b and 40c combine (constructively interfere), at or before reaching the target 26, so as to form a composite output beam 42. The composite output beam 42, composed of sub-beams 40a, 40b and 40c, is representative of any one of the composite output beams 14a, 14b and 14c illustrated in FIG. 1. The beam directing arrangement 38 is shown in FIG. 2 only schematically, but typically includes a separate collimator for each of the beams, and common large-aperture focusing optics for directing the beams collectively towards the target 26 so as to combine at or before reaching the target 26. Alternatively, separate focusing optics can be provided for each beam. Within the context of this document, coherent sub-beams that are combined at or before reaching the target generally refers to coherent sub-beams that are either brought into coherent combination at the target, or brought into coherent combination before the target and sustain coherent combination over the remaining distance to the target. The term "target" is used here broadly to refer to the object against which the beams 40a, 40b and 40c (and the composite output beams 14a, 14a and 14c) are to impinge, which in certain preferred applications is a target in the military sense for weapon applications, but may also be a receiver (detector) for communications applications. In fact, the system 10 is of particular value in situations in which the target 26 is a remote non-cooperative target (as in the military sense). However, the system 10 may also be of use in situations in which the target 26 is a cooperative target, for example in situations where the system is used as a diagnostic or research tool, or as a measurement tool in support of another device/system. In such situations, a detector may be mounted to the target 26, and may provide the system 10 with feedback via a communication link.

Although the sub-beams (i.e., the coherent beams 40a, 40b and 40c) for each of the respective composite output beams 14a, 14b and 14c are coherent so as to constructively interfere, the composite output beams 14a, 14b and 14c themselves are mutually incoherent. In other words, whereas the sub-beams of a particular composite output beam have the same effective wavelength and phase, the composite output beams 14a, 14b and 14c have different respective effective wavelength and/or phase.

It is noted that the number of sub-beams generated by the beam emitting subsystems need not necessarily be uniform across the beam emitting subsystems. In other words, each of the composite output beams 14a, 14b and 14c may be composed of a different respective number of sub-beams. For example, one of the beam emitting subsystems may generate on the order of 10 sub-beams (i.e., may include on the order of 10 beam sources), while another of the beam emitting subsystems may generate between 15-40 sub-beams (i.e., may include 15-40 beam sources), while yet another of the beam emitting subsystems may generate on the order of 100 beam sources (i.e., may include on the order of 100 beam sources).

A part of the radiation impinging on the target 26 is reflected (typically backscattered) by the target 26 towards the targeting receiver 16 that is associated with the beam emitting subsystems 12a, 12b and 12c. In general, in response to illumination of the target 26 by each of the composite output beams 14a, 14b and 14c, a proportion of the radiation intensity of each of the composite output beams 14a, 14b and 14c is reflected from the target 26 as a corresponding reflected radiation component, designated by thin dashed arrows 15a, 15b and 15c. The intensity of the reflected radiation (corresponding to reflected radiation component 15a, 15b and 15c) varies as a function of the radiation intensity (from the composite output beams 14a, 14b and 14c) impinging on the area of the target 26. In FIG. 2, the reflected radiation from a single composite beam 42 is generally designated 43. It is noted that the reflected radiation 43 includes radiation components corresponding to the reflections of each of the sub-beams 40a, 40b and 40c from the target 26.

The receiver 16 is deployed and configured to receive the radiation (i.e., light) reflected from the target 26, which includes the radiation received from the reflected radiation components 15a, 15b and 15c. The receiver 16 may be deployed in a location that is co-located with one or more of the beam emitting subsystems 12a, 12b and 12c. Alternatively, the receiver 16 may be deployed in a separate location from some or all of the beam emitting subsystems 12a, 12b and 12c. Further still, the major components of the receiver 16 may be co-located or distributed across various geographic locations. Regardless of the particular deployment configuration of the receiver 16 and its major components, the receiver 16 is preferably deployed independently from the beam emitting subsystems 12a, 12b and 12c, and should be deployed such that radiation corresponding to all of the reflected radiation components 15a, 15b and 15c reaches specific major components of the receiver 16.

In general, the radiation reflected from the target (i.e., the reflected radiation) includes a plurality of components of radiation, some of which correspond to the reflected radiation components 15a, 15b and 15c, and some of which correspond to other sources of radiation, including, for example atmospheric noise. The reflected radiation components 15a, 15b and 15c are combined (i.e., the radiation intensity of the reflected radiation components 15a, 15b and 15c is summed) at or before reaching the receiver 16 so as to form "combined radiation". The intensity of the combined radiation (which is composed of the reflected radiation components 15a, 15b and 15c) is indicative of the intensity of the radiation impinging on the area of the target 26 by the respective composite output beams 14a, 14b and 14c. In certain preferred embodiments, the receiver 16 is associated with a radiation distinguishing module 22 that is configured to separate an intensity parameter of the combined radiation (an intensity signal of the combined radiation) so as to be able to distinguish the intensity parameter for each reflected radiation component, corresponding to a respective component of the combined radiation, from the intensity parameter of the combined radiation of all of the other reflected radiation components. In other words, in such embodiments, the radiation distinguishing module 22 associated with the receiver 16 is configured to distinguish the reflected intensity signal attributable to each respective one of the beam emitting subsystems 12a, 12b and 12b from the received reflected intensity signal of the combined reflected radiation. As will be discussed, in certain embodiments the radiation distinguishing module 22 is functionally part of the receiver 16 (i.e., the radiation distinguishing module 22 is a component of the receiver 16), while in other embodiments the radiation distinguishing module 22 is a separate component from the receiver 16 and can be deployed independently from the receiver 16.

It is noted that for each of the composite output beams 14a, 14b and 14c, a proportion of the intensity of the sub-beams (e.g., beams 40a, 40b and 40c) is reflected from the target 26. When discussing the reflected radiation components 15a, and 15c, it is noted that these components are representative of the combination of the reflected radiation sub-components of the respectively associated composite output beams 14a, 14b and 14c. In other words, the reflected radiation component 15a is representative of the combination of the reflected radiation sub-components of the composite output beams 14a, the reflected radiation component 15b is representative of the combination of the reflected radiation sub-components of the composite output beam 14b, and so on. Accordingly, the combined radiation, which is formed from the combination of the radiation corresponding to the reflected radiation components 15a, and 15c, in fact includes the radiation corresponding to all of the reflected radiation sub-components of all of the associated composite output beams 14a, 14b and 14c. The receiver 16 is therefore configured to separate the received combined radiation in order to identify, for a particular beam emitting subsystem, the subsets of the reflected radiation sub-components that correspond to a particular composite output beam generated by that beam emitting subsystem. In other terms, the receiver 16 is configured to separate the received combined radiation in order to distinguish, for a particular beam emitting subsystem, the components of the combined radiation corresponding to the composite output beam generated by that beam emitting subsystem.

In order to ensure that receiver 16 receives the correct radiation, an optical arrangement, typically in the form of a targeting telescope, is deployed to define a field of view corresponding to the region from which the reflected radiation will arrive, such that the reflected radiation is collected by the optical arrangement (at least the combined radiation reaches the input aperture of the optical arrangement). The optical arrangement is represented schematically in FIG. 1 by a lens 18, but is typically an assembly of lenses, which may be refractive or reflective, or any combination thereof, to form an appropriate telescope, as is known in the art. The telescope 18 defines an optical path from the target 26 to the receiver 16.

Parenthetically, in order to direct the output beams 14a, 14b and 14c onto the same area of the target 26 (also referred to as the same "spot"), coarse alignment of the output beams 14a, 14b and 14c is applied by individual tracking subsystems for each of the beam emitting subsystems 12a, 12b and 12c, up to a point where the extended lobes (i.e., side lobes) of the radiation pattern of the output beams 14a, 14b and 14c are overlapping. The alignment of the central lobes of the output beams 14a, 14b and 14c is achieved by closing a loop via the receiver 16, which provides feedback to the beam emitting subsystems 12a, 12b and 12c. In certain embodiments, the optical arrangement (i.e., telescope 18) also preferably forms part of an imaging system or is integrated with an imaging system, which can be used for aiming each of the beam emitting subsystems 12a, 12b and 12c. The imaging system creates an image of the target 26 and the desired area of the target 26 (or "spot") upon which the composite output beams 14a, 14b and 14c are to impinge. By forming an image of the target 26 and the spot, the composite output beams 14a, 14b and 14c can be properly aimed at the target 26 (such that the side lobes of the composite output beams 14a, 14b and 14c overlap) and the intensity of the composite output beams 14a, 14b and 14c can be optimized (via a control system). The imaging system is not illustrated here, but a non-limiting example of a telescope integrated with an imaging system will be described in subsequent sections of the present disclosure, with reference to FIGS. 5 and 6.

The reflected radiation collected at the input aperture of the telescope 18 is focused, by the telescope 18, onto a focal plane. A spatial filtering configuration 20, associated with the telescope 18, is deployed at the focal plane. The spatial filtering configuration 20 is configured to spatially filter the reflected radiation collected by the telescope 18 to produce "filtered radiation" by passing only the components of the reflected radiation originating from the "spot" on the target 26 (these components of the reflected radiation are represented as the previously mentioned "combined radiation"), such that substantially only the radiation resulting from illumination of the target 26 by the composite output beams 14a, 14b and 14c (i.e., reflected radiation components 15a, 15b and 15c) is passed by the spatial filtering configuration 20. A narrow passband filter (not shown) may be deployed in the optical path between the telescope 18 and the spatial filtering configuration 20 to exclude ambient background radiation emanating from the illuminated area of the target 26, thereby enhancing the signal-to-noise ratio at the illumination sensing components of the system 10.

The spatial filtering configuration 20 may be implemented in various ways. In one non-limiting implementation, the spatial filtering configuration 20 is implemented as a pinhole which acts as a low pass filter for the spatial frequencies in the image plane of the telescope 18. Similarly, the spatial filtering configuration 20 can be implemented using an optical fiber, in which the edge of the optical fiber is positioned in the image plane of the telescope 18. Here, only the light with the desired spatial frequencies is coupled to the core of the optical fiber. Alternatively, the spatial filtering configuration 20 can be implemented using a small detector deployed at the exit aperture of the telescope 18. After the intensity of the composite output beams 14a, 14b and 14c is optimized (for example via the aforementioned imaging system and control system), the size of the spatial filtering configuration 20, for example the size of the pinhole, can be used in order to determine the size and position of the central lobes of the composite output beams 14a, 14b and 14c relative to the desired spot on the target 26.

The deployment of the receiver 16 with the spatial filtering configuration 20 enables the receiver 16 to "see" the common spot on the target 26 that is illuminated by the beam emitting subsystems 12a, 12b and 12c. Accordingly, the receiver 16 can provide feedback signals or information to the beam emitting subsystems 12a, 12b and 12c based on the captured reflected radiation from the target spot.

One particular method for generating such feedback according to embodiments of the present disclosure is based on distinguishing certain components of the combined radiation (provided by the spatial filtering configuration 20) from the remaining components of the combined radiation. The radiation distinguishing is performed by the radiation distinguishing module 22 that is associated with the telescope 18 and the spatial filtering configuration 20, and that is deployed to receive the combined radiation from the spatial filtering configuration 20. In the non-limiting exemplary implementation illustrated in FIG. 1, the radiation distinguishing module 22 is part of the receiver 16, however, as will be discussed, all or some of the components of the radiation distinguishing module may be separate from the receiver 16. In certain embodiments, a plurality of radiation distinguishing modules may be deployed, each one being associated with (or being a part of) a respective one of the beam emitting subsystems. For clarity of illustration of the function and operation of the radiation distinguishing module 22, the radiation distinguishing module will be described within the context of being part of the receiver 16, unless explicitly stated otherwise.

Preferably, the radiation distinguishing module 22 receives the filtered radiation from the spatial filtering configuration 20, such that substantially only the combined radiation is received by the radiation distinguishing module 22. The radiation distinguishing module 22 is further configured to separate the combined radiation so as to be able to distinguish, for each reflected radiation component, an intensity parameter (an intensity-bearing signal) of the reflected radiation component (that corresponds to one of the components of the combined radiation, as well as one of the composite output beams), from an intensity parameter (intensity-bearing signal) of the combined radiation of all of the other reflected radiation components. In particular, the radiation distinguishing module 22 is configured to receive reflected radiation having an intensity parameter that is representative of the combined radiation from the reflected radiation components, and to distinguish (for each of the reflected radiation components) the intensity parameter of particular components of the reflected radiation that correspond to that reflected radiation component.

A control subsystem 23 that has at least one controller 24, including logic circuitry, is associated with the radiation distinguishing module 22 and the beam emitting subsystems 12a, 12b and 12c via one or more communication and/or data links, and is configured to receive output signals produced by the radiation distinguishing module 22, process those received signals, and provide the processed signals to the beam emitting subsystem 12a, 12b and 12c in order to allow adjustment of the composite beams 14a, 14b and 14c, including adjustment of beam parameters of the coherent sub-beams generated by each of the beam emitting subsystem 12a, 12b, 12c. The logic circuitry of controller 24 may be implemented as suitably configured hardware using digital and/or analog processing, including but not limited to, one or more application specific integrated circuit (ASIC), one or more field programmable gate array (FPGA), one or more digital signal processor (DSP), as a general purpose computing system configured by software operating under a suitable operating system, or by any hardware/software/firmware combination configured to perform the functions described herein at a suitable rate. The controller 24 typically also includes a data storage device and suitable input and output interfaces for controlling the beam emitting subsystems 12a, 12b and 12c (either directly or indirectly) and receiving inputs from the radiation distinguishing module 22, all as will be clear to one having ordinary skill in the art.

The controller 24 may be linked to the receiver 16 via, for example, a data bus or a data link, which may be a wired data link or a wireless data link. In certain embodiments, the data link is embodied as a communication link of a communication network (including, for example, a wired network, a wireless network, a cellular network, a satellite communication network, a private network such as an Intranet, and the like). In such embodiments, the controller 24 preferably includes communications hardware and/or software components for transmitting/receiving data to/from the receiver 16 via a communication interface of the controller 24. The controller 24 is also linked to the beam emitting subsystems 12a, 12b, 12c, preferably via a data bus or data link. Preferably the receiver 16 and the beam emitting subsystems 12a, 12b, 12c are deployed in a deployment configuration that supports low-latency data transmission (via the control subsystem 23) between the receiver 16 and the beam emitting subsystems 12a, 12b, 12c.

The control subsystem 23 may be further associated with a master unit that transmits a low-power guide beam, and may perform direction vector calculation, so as to enable high precision combination of the output beams 14a, 14b and 14c on the common target spot, as described in earlier sections of the present disclosure.

Generally speaking, the present disclosure proposes two main approaches for performing the signal separation via the radiation distinguishing module 22, which utilize two different implementation architectures. Both architectures rely on each of the beam emitting subsystems 12a, 12b, 12c having an assigned locally unique signature that is associated with the respective composite beams 14a, 14b and 14c. The unique signatures are assigned such that each of the components 15a, 15b and that make up the combined radiation can be uniquely identified (i.e., is uniquely identifiable) in the combined radiation according to the signatures associated with the composite beam that is attributable to the radiation component. Within the context of this document, a component of the combined radiation is identifiable in (or separable from) the combined radiation if the intensity signal of that component can be accurately separated from the intensity signal of the combined radiation. Preferably, the combined radiation intensity bears information pertaining to the locally unique signatures of all of the constituent components (15a, 15b and 15c) so as to enable extraction of the intensity of each constituent component from the combined radiation intensity.

Within the context of this document, the term locally unique signature general refers to a signature assigned to a particular beam emitting subsystem of the system that is unique to that beam emitting subsystem such that there is a one-to-one relationship between signature and beam emitting subsystem (i.e., a signature assigned to one beam emitting subsystem of the system 10 is not assigned to any of the other beam emitting subsystems of the system 10). It is noted that some or all of the signatures of the system 10 may be used as signatures for the beam emitting subsystems of other systems, generally similar to the system 10, but deployed at a different locations from each other and from the system 10, so long as the reflected radiation components of the beam emitting subsystems of each of the systems can be accurately distinguished from the received reflected radiation.

According to a first non-limiting implementation, the radiation distinguishing module 22 performs the desired signal separation using dispersive optics to achieve spectral separation of the received radiation. In this first non-limiting implementation, the signature of the beam emitting subsystems 12a, 12b and 12c and the corresponding output composite beams 14a, 14b and 14c is transmission wavelength or wavelength region (spectral sub-band or sub-region). According to a second non-limiting implementation, the radiation distinguishing module 22 performs the desired signal separation by decoding encoded information in the phase of the sub-beams of the output composite beams 14a, 14b and 14c. In this second non-limiting implementation, the signature of the beam emitting subsystems 12a, 12b and 12c and the corresponding output composite beams 14a, 14b and 14c is a code (which can be, for example, a modulation frequency or sequence/waveform). It is noted that in embodiments in which the spatial filtering configuration 20 is implemented using a small detector deployed at the telescope exit aperture, losses in spectral information at the detector could make radiation distinguishing via spectral separation ineffective. Therefore, in such embodiments, it is preferable to implement the radiation distinguishing module 22 according to the second non-limiting implementation.

Figure 3:
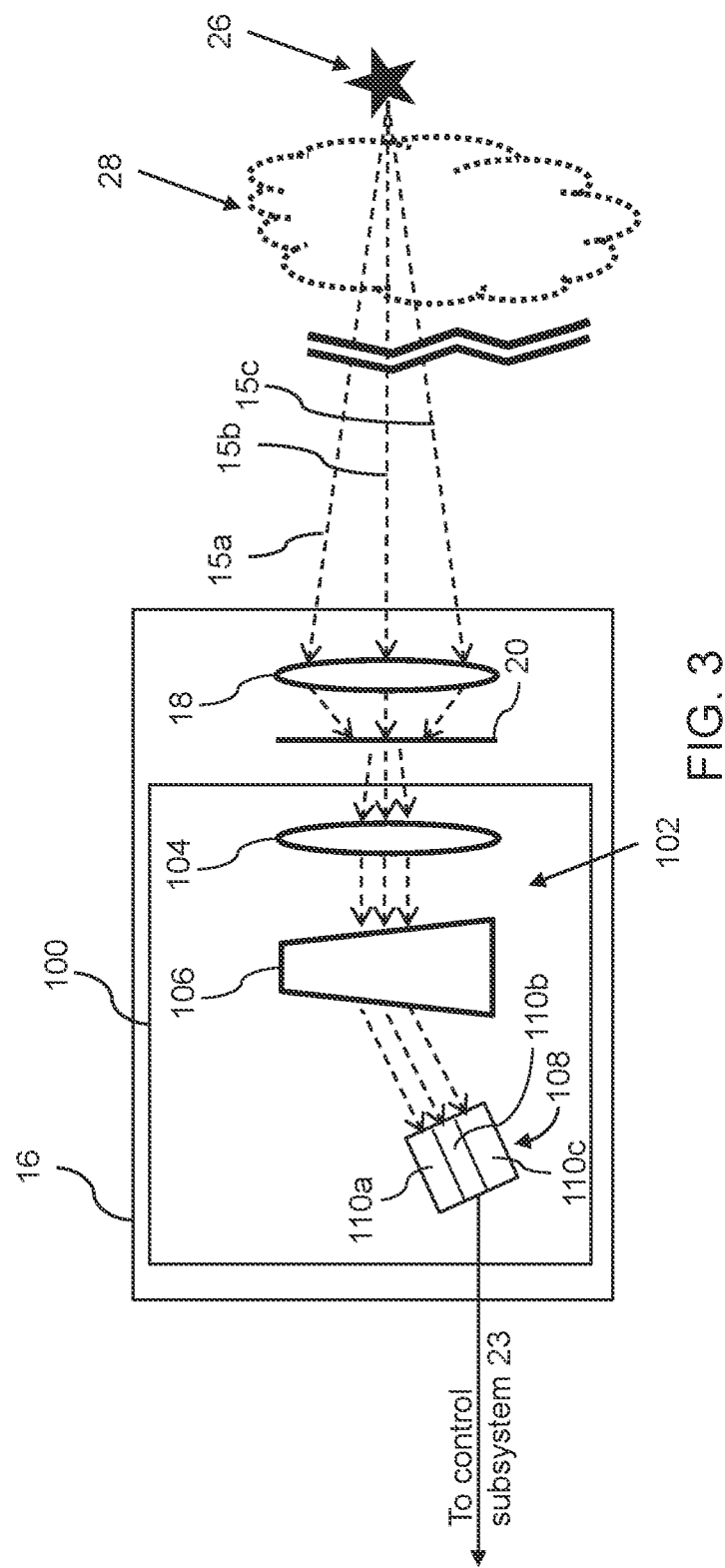
FIG. 3 is a schematic representation of the receiver of FIG. 1, in which the radiation distinguishing module includes dispersive optics and a detector arrangement for distinguishing components of the reflected radiation from other components of the reflected radiation, according to embodiments of the present invention.

The following paragraphs describe, with reference to FIG. 3, a receiver 16 having a radiation distinguishing module 100 according to the first non-limiting implementation. By way of introduction, in order for the radiation distinguishing module 100 to achieve effective spectral separation of the filtered and collimated radiation according to the first non-limiting implementation, the output beams 14a, 14b and 14c should occupy different respective spectral sub-bands or sub-regions of the electromagnetic spectrum, in accordance with the signature of the beam emitting subsystems (i.e., the spectral sub-band or sub-region at which each beam emitting subsystem is configured to transmit beams). As mentioned above, the principles of the embodiments of the present disclosure may be used for devices operating with various different wavelengths, but is typically implemented in the NIR range, which generally refers to light having wavelength in the range of 800-2500 nanometers (nm). Accordingly, in such typical implementations, the beam emitting subsystems 12a, 12b and 12c are configured to generate output beams 14a, 14b and 14c that occupy different respective sub-bands or sub-regions in the NIR range. For example, the beam emitting subsystem 12a may be configured to generate the output beam 14a at a wavelength $\lambda_1$ of approximately 1060 nm, the beam emitting subsystem 12b may be configured to generate the output beam 14b at a wavelength $\lambda_2$ of approximately 1065 nm, and the beam emitting subsystem 12c may be configured to generate the output beam 14c at a wavelength $\lambda_3$ of approximately 1070 nm. Here, the signature of the beam emitting subsystem 12a is radiation at wavelength $\lambda_1$, the signature of the beam emitting subsystem 12b is radiation at wavelength $\lambda_2$, and the signature of the beam emitting subsystem 12c is radiation at wavelength $\lambda_3$.

Turning now to the structural details of the radiation distinguishing module 100 of FIG. 3 in more detail, the radiation distinguishing module 100 includes a detector arrangement 108 and an optics arrangement 102 deployed in the optical path from the target 26 to the detector arrangement 108. The optics arrangement 102 may include a collimating optical element, represented schematically in FIG. 3 by a lens 104, but may be an assembly of lenses, and a dispersive optical component 106. The dispersive optical component 106 is represented schematically in FIG. 3 by a prism, but may alternatively be implemented as one or more diffractive gratings.

The collimating optical element 104 receives the filtered radiation from the spatial filtering configuration 20, and collimates the radiation so as to produce filtered and collimated radiation. The collimated radiation impinges on the dispersive optical element 106, which separates the filtered and collimated radiation into the constituent wavelengths corresponding to the output beams 14a, 14b and 14c (i.e., according to the spectral signature of each beam emitting subsystem). For each constituent wavelength, the separated radiation for that wavelength is deflected in a specific direction in accordance with the deflecting angle for that wavelength applied to the collimated radiation by the dispersive optical element 106. The now spectrally separated radiation impinges on the detector arrangement 108, which is configured to separately measure radiation at each respective wavelength of the constituent wavelengths. The radiation at each constituent wavelength impinges on a different respective region of the detector arrangement 108, in accordance with the deflection direction of the radiation. In embodiments in which the detector arrangement 108 is implemented as an array of photodetectors, the array of photodetectors preferably includes one photodetector per constituent wavelength, deployed at the requisite positions dictated by the deflection angle so as to be able measure the radiation intensity of the radiation at the constituent wavelength. This is exemplarily illustrated in FIG. 3, which shows three such photodetectors 110a, 110b and 110c. The photodetectors 110a, 110b and 110c are configured to measure the radiation intensity of the reflected radiation components 15a, 15b and 15c in parallel, so as to isolate (distinguish) the radiation intensity of each of the reflected radiation components 15a, and 15c from the combined radiation intensity. Each individual photodetector is sensitive to radiation in a different particular sub-band or sub-region of the electromagnetic spectrum, corresponding to the wavelength at which the output beams 14a, 14b and 14c are transmitted by the beam emitting subsystems 12a, 12b and 12c. For example, continuing with the previously described example of the output beams 14a, 14b and 14c having respective wavelengths of approximately 1060 nm, 1065 nm, and 1070 nm, the photodetectors 110a, 110b and 110c may be configured to be sensitive to radiation in the respective ranges of 1059-1061 nm, 1064-1066 nm, and 1069-1071 nm.

The detector arrangement 108 is configured to generate, for each constituent wavelength, a signal ("intensity parameter") that is indicative of the intensity of the radiation impinging on the area of the target 26 by the respective output beams 14a, 14b and 14c. In embodiments in which the detector arrangement 108 is implemented as an array of photodetectors, each of the photodetectors 110a, 110b and 110c generates such a signal. In other words, the photodetector 110a generates a first signal that is indicative of the radiation intensity impinging on the area of the target 26 by the output beam 14a, the photodetector 110b generates a second signal that is indicative of the radiation intensity impinging on the area of the target 26 by the output beam 14b, and so on. Each of the generated signals varies as a function of the radiation intensity (from the corresponding composite output beam) impinging on the area of the target 26.

The controller 24 receives the signals (i.e., the intensity parameters) from the detector arrangement 108. These received signals can be subsequently processed in order to allow the beam emitting subsystems 12a, 12b and 12c to perform additional functions, including adjustment of beam parameters of the respective sub-beams. In certain non-limiting implementations, the control subsystem 23 includes a dedicated control/processing unit for each of the beam emitting subsystems 12a, 12b and 12c, which allows for further processing on the signals received from the detector arrangement 108. In such implementations, for example, the controller 24 provides the first signal to a control/processing unit of the beam emitting subsystem 12a, provides the second signal to a control/processing unit of the beam emitting subsystem 12b, and so on.

In one non-limiting implementation, the signals received by the controller 24 from the detector arrangement 108 are used to adjust beam parameters of the sub-beams of one or more of the beam emitting subsystems 12a, 12b and 12c by performing phase correction of the phases of the sub-beams in order to achieve effective coherent combination of the sub-beams for each of the output beams 14a, 14b and 14c. In general, for each of the beam emitting subsystems 12a, 12b and 12c, the associated signal (i.e., intensity parameter) is monitored (either by the controller 24 or a dedicated control/processing unit of that beam emitting subsystem) while each phase modulator of the beam emitting subsystem is actuated to modulate a current phase of the correspondingly transmitted sub-beam between at least three phase states (typically an initial "unmodified" phase state and two "modified" phase states). The monitoring of the signal includes analyzing of the signal (either by the controller 24 or the control/processing unit of that beam emitting subsystem) to identify variations in the measured intensity parameter resulting from the modulation of the current phase of each transmitted sub-beam relative to a sum of all other sub-beams. The controller 24 or the control/processing unit of that beam emitting subsystem then calculates (based on the identified variations) a phase offset of the current phase for each sub-beam relative to a representative phase of the sum of all the other sub-beams emitted by that particular beam emitting subsystem.

This process of modulating the phase of the sub-beams, identifying corresponding variations in the measured intensity parameter, calculating the phase offset of a sub-beam and correction of that phase offset are preferably repeated in rapid cycles, thereby correcting in real-time for dynamic variations in the operating conditions, which may result from fluctuations in the beam generating hardware or from fluctuating atmospheric conditions caused by atmospheric turbulence. Further details of this process can be found in WO 2020/016824 A1, which is hereby incorporated by reference in its entirety herein.

It is noted that the current phase of each sub-beam is modulated at a particular modulation frequency. In one non-limiting example, the phase of each sub-beam is varied (by the controller 24 or the control/processing unit of that beam emitting subsystem) in a sinusoidal manner about a central phase state by a phase variation modulation amplitude $\Phi_m$ at a modulation frequency $\omega_0$. Preferably, modulation frequencies anywhere in the MHz to GHz range are used. In particular, a range of modulation frequencies between 100 kHz and 20 MHz have been found suitable. In another non-limiting example, the phase of each sub-beam is modulated stepwise between a current base value and two discrete modulated values. Regardless of the modulation approach (i.e., continuous/sinusoidal or discrete), an additional layer of modulation or coding can be applied on top of this lower level modulation. This additional layer of modulation/coding is of particular use in situations in which an approach to signal separation, different from the spectral separation approach previously described, is employed. This may be the case, for example, in situations where spectral separation of the filtered and collimated radiation is not achievable, for example in scenarios in which the constituent beams transmitted by the beam emitting subsystems 12a, 12b and 12c have densely packed spatial frequencies and the physical limitations of the dispersive optical component 106 may not enable clean separation of the received radiation into the proper constituent radiation components. In such scenarios, a different approach to signal separation is taken in which the radiation distinguishing module 22 is implemented according to a second non-limiting implementation so as to achieve signal separation by decoding information (i.e., the code, or signature) that is encoded in the phase of the sub-beams of the output beams 14a, 14b and 14c by this additional layer of modulation/coding.

Figure 4:
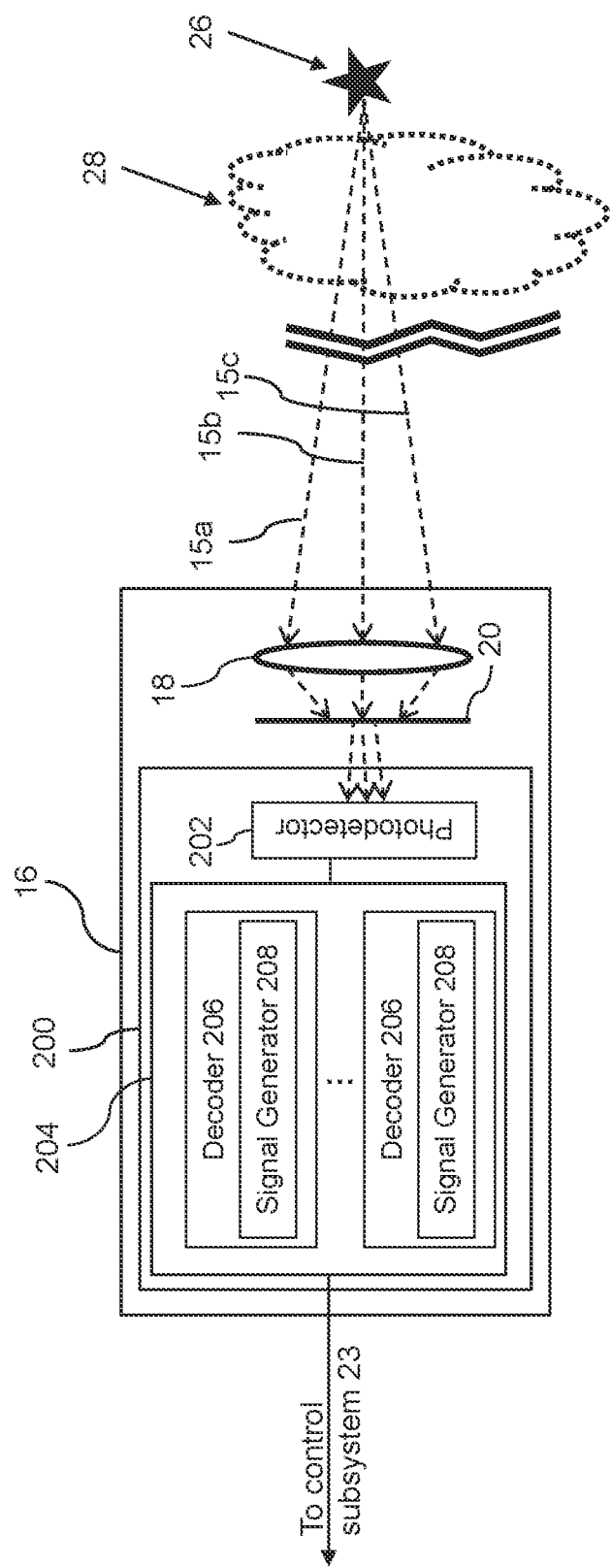
FIG. 4 is a schematic representation of the receiver of FIG. 1, in which the radiation distinguishing module includes a photodetector and a decoding module that decodes information in the collected reflected radiation in order to distinguish components of the reflected radiation from other components of the reflected radiation, according to embodiments of the present invention.

The following paragraphs describe, with reference to FIG. 4, a receiver 16 having a radiation distinguishing module 200 according to the second non-limiting implementation. By way of introduction, in order for the radiation distinguishing module 200 to achieve the aforementioned signal separation, the current phase of each sub-beam (for a particular beam emitting subsystem) is encoded with a code (signature) that is unique to the particular beam emitting subsystem via the encoding module 44 (FIG. 2). This encoding is applied on top of the continuous/sinusoidal or discrete lower-level modulation of the phase of each sub-beam discussed above. It is noted that the term "encoding", as used herein, encompasses both of traditional analog and digital modulation used in analog and digital communications systems, and traditional information encoding techniques, including those used in spread spectrum communication. The "code" that is used to encode the phase may be, for example, a particular frequency, a particular sequence/waveform, or any other suitable type of code that can be used to uniquely encode information. It is noted that codes used to encode the phase information are locally unique to the system 10 and its relevant corresponding components (i.e., beam emitting subsystems).

Bearing this in mind, various types of encoding by the encoding module 44 fall within the scope of the present disclosure. In one non-limiting example, the encoding module 44 is configured to apply an additional layer of analog frequency modulation on top of the continuous/sinusoidal or discrete lower-level modulation of the phase of each sub-beam. In this example, the encoding module 44 includes one or more analog frequency modulator configured to modulate the lower-level-modulated current phase of each sub-beam at a (code) modulation frequency $\omega_m$. The analog frequency modulator is embodied as a waveform/signal generator 46 for generating a carrier signal at the modulation frequency, and for modulating the phase with the carrier signal. In certain particularly preferable implementations, the modulation frequency $\omega_m$ is higher than the modulation frequency $\omega_0$, and in certain more preferable implementations, the modulation frequency $\omega_m$ is significantly higher (e.g., an order of magnitude larger) than the modulation frequency $\omega_0$ (i.e., $\omega_m \gg \omega_0$). As mentioned above, the lower-level modulation frequency $\omega_0$ is preferably selected from a frequency in the range between 100 kHz and 20 MHz. Accordingly, in such preferable implementations the top-level modulation frequency $\omega_m$ may be selected from a frequency in the range between 1 MHz and 100 MHz. For example, if the low frequency modulation is in the rage between 1 and 2 MHz, the high frequency modulation can be in the range between 10 and 20 MHz.

Each composite output beam is assigned at least one such modulation frequency $\omega_m$. In some cases, the modulated phases of all of the sub-beams may be modulated at the same unique modulation frequency $\omega_m$. In such cases, a single such waveform/signal generator 46 may be coupled to all of the phase modulators of the beam emitting subsystem so as to modulate the phase for all of the sub-beams generated by that beam emitting subsystem. Alternatively, a waveform/signal generator may be provided one per phase modulator, such that the phase of each sub-beam is modulated by a respective waveform/signal generator. In other cases, the modulated phase of each sub-beam is modulated at a different unique modulation frequency which can be higher or lower than the lower-level modulation frequency $\omega_0$. For example, for a beam emitting subsystem that transmits a composite output beam composed of three sub-beams, the modulated phase of first sub-beam may be modulated with a first modulation frequency $\omega_{m1}$, the modulated phase of first sub-beam may be modulated with a first modulation frequency $\omega_{m2}$, and the modulated phase of first sub-beam may be modulated with a first modulation frequency $\omega_{m2}$. In such cases each phase modulator of the particular beam emitting subsystem has an associated waveform/signal generator configured to modulate the phase of a respective sub-beam. It is noted that since the system 10 generally includes a battery of beam emitting subsystems, each having on the order of tens or hundreds of beam sources, assigning each individual beam source a unique modulation frequency may present problems in terms of bandwidth and spectral efficiency. In addition, modulating each of the lower-levelmodulated phases with a unique modulation frequency would require corresponding demodulation hardware at the receiver, resulting in a bank of demodulators (one for each modulation frequency). It may therefore be preferable to modulate the lower-level-modulated phase of all of the sub-beams of a single beam emitting subsystem at a common modulation frequency unique to that beam emitting subsystem. Alternatively, the modulation of the lower-level-modulated phases of different sub-beams of a particular beam emitting subsystem may be performed sequentially.

In another non-limiting example, the encoding module 44 is configured to encode the lower-level-modulated current phase with a distinct code sequence unique to the beam emitting subsystem and the output beam produced by that beam emitting subsystem. The code sequence may be any code sequence (for example a binary sequence) that can appropriately be used to differentiate between the reflected radiation components (and by extension the corresponding output beams which generate the reflected radiation components). In one non-limiting example, the code sequence may be selected from a set of pseudorandom sequences that are mutually orthogonal such that each sequence has high autocorrelation and low cross correlation with the other sequences, as is commonly used in certain spread spectrum communication techniques, such as code division multiple access (CDMA), as is well-known in the art. In this non-limiting example implementation, the encoding module 44 may include a sequence generator for generating code sequences (for example a pseudorandom number generator, which are well-known in the art and are readily commercially available), and a waveform generator (i.e., signal generator) for generating waveforms associated with each of the code sequences. In the context of binary sequences, a simple example of a waveform (signal) that can be generated by a waveform generator is a rectangular pulse-amplitude modulated waveform that outputs a "high" voltage for a binary "1" and a "low" voltage for a binary "0". The sequence generator and the waveform generator may be combined as a single functional element which generates waveforms based on pseudorandom binary sequences (commonly referred to as PN sequences). In this context, the signal generator 46 is operative to perform functions for sequence generation and signal/waveform generation. In addition, the signal generator 46 is operative to modulate the lower-level-modulated current phase of each sub-beam with a generated waveform (although this modulation may be executed by a separate modulator/multiplier component of the encoding module 44). In certain preferred implementations, the phases of all of the sub-beams generated by a particular beam emitting subsystem are modulated by the same generated waveform. In other words, for each beam emitting subsystem, a single unique code sequence is used to encode the phase information for all of the sub-beams generated by that beam emitting subsystem. A single signal generator may be coupled to all of the phase modulators of the beam emitting subsystem so as to modulate the phase of each of the sub-beams with a common signal generator. Alternatively, each beam source of the beam emitting subsystem may have an associated signal generator that modulates the phase of the sub-beam generated by the beam source. In addition, and similar to as described in the frequency modulator example discussed above, the lower-level-modulated phase of each sub-beam of a particular beam emitting subsystem may be provided with a unique encoding, such that all of the sub-beams of the entire system 10 each have a unique code. However, here too this may raise performance issues, as the receiver 16 is required to cycle through a large number of demodulating waveforms (code sequences) in order to receive the modulated phase of all of the sub-beams generated by all of the beam emitting subsystems.

Although the phase encoding process has been described within the context of specific examples of top-level frequency modulation and (binary) sequence (waveform) encoding, the scope of the embodiments of the present disclosure should not be limited to the particular examples of frequency modulation and encoding sequences described above. As should be apparent to those skilled in the art, a wide variety of techniques for encoding the lower-level-modulated phases of the sub-beams is available, including techniques typically utilized in spread spectrum communications systems and free space optical communications, including, multiplexing and/or multiple access techniques such as, for example, orthogonal/optical frequency division multiplexing (OFDM) and frequency division multiple access (FDMA).

Turning now to the structural details of the radiation distinguishing module 200 of FIG. 4 in more detail, the radiation distinguishing module 200 includes a photodetector 202 and a decoding module 204. The photodetector 202 is configured to receive the filtered radiation from the spatial filtering configuration 20, such that substantially only the combined radiation is sensed by photodetector 202. The photodetector 202 converts the sensed radiation into a received signal (i.e., the photodetector 202 generates a signal ("intensity parameter"), from the received combined radiation). Preferably, the photodetector 202 is AC coupled (for example via a DC blocking capacitor) so as to remove DC offsets from the signal and prevent detector saturation. The signal, generated by the photodetector 202, is representative of the combined (i.e., summed) radiation intensity of the reflected radiation components 15a, 15b and 15c, and is indicative of the combined radiation intensity impinging on the area of the target 26. In particular, the generated signal varies as a function of the combined (i.e., summed) radiation intensity (corresponding to the composite output beams 14a, 14b and 14c) impinging on the area of the target 26. The signal includes multiple signal components, each component corresponding to the radiation intensity associated with a respective one of the composite output beams 14a, 14b and 14c. Since the phases of the sub-beams of each of the composite output beams 14a, 14b and 14c is encoded with a code that is unique to the beam emitting subsystem that transmitted the composite output beam, the signal component corresponding to each individual composite output beam (and each individual beam emitting subsystem) can be isolated, i.e., separated from the other signal components of the overall received signal.

The decoding module 204 is configured to perform the above-mentioned signal separation by applying decoding techniques in order to isolate individual signal components from the received signal. The decoding module 204 may include a bank of decoders 206, and preferably includes one decoder for each unique code used to encode information by the encoding modules of the beam emitting subsystems. For example, in the non-limiting example in which the encoding module 44 for each beam emitting subsystem is implemented as one or more analog frequency modulator, the decoding module 204 includes a corresponding number of demodulators (decoders), embodied as signal generators 208. If the encoding module 44 for each beam emitting subsystem is configured to modulate the lower-level-modulated phases of all of the sub-beams generated by that beam emitting subsystem with the same modulation frequency $\omega_m$, the decoding module 204 will include one decoder (implemented, for example, as a signal generator that generates the demodulation signal and performs the frequency demodulation to generate the demodulated signal) per beam emitting subsystem. The decoders are preferably configured to operate in parallel, such that the received signal is simultaneously decoded by each of the decoders. When the decoders 206 are implemented as a bank of demodulators, the decoding module 204 may include a low-pass filter associated with each demodulator for removing residual signal effects and noise from the demodulated signals.

In the non-limiting example in which the encoding module 44 for each beam emitting subsystem is configured to encode the lower-level-modulated current phase of the sub-beams with a distinct code sequence unique to the beam emitting subsystem, the bank of decoders 206 are configured with components for decoding the signal based on the sequences so as to isolate the relevant signal components from the received signal. Here too the decoders 206 may be deployed one-per sequence, and each decoder may be assigned a specific one of the sequences. In this context, each of the signal generators 208 is operative to perform functions of sequence generation and waveform generation for generating the code sequence assigned to that decoder and generating the waveform associated with the assigned code sequence (the sequence generator and waveform generator may be combined as a single functional element). The signal generators are also preferably configured to perform demodulation by demodulating the received signal with the generated waveform (i.e., applies the generated waveform to the received signal). Additional logic circuitry, embodied as part of the decoders 206, is configured to identify correlation peaks in the demodulated signal to isolate the signal component corresponding to the relevant composite output beam (and relevant beam emitting subsystem) from the overall received signal.

Each decoder 206 provides the isolated component of the received signal as an output signal, such that the decoding module 204 outputs a plurality of output signals (one output signal per decoder). In the non-limiting exemplary implementation illustrated in FIG. 4, the controller 24 receives the output signals (which are indicative of the radiation intensity impinging on the area of the target 26 by the respective composite output beams 14a, 14b and 14c) from the bank of decoders 206. The output signals received by the controller 24 can be subsequently processed in order to allow the beam emitting subsystems 12a, 12b and 12c to perform additional functions, for example to adjust beam parameters of the generated sub-beams by performing phase correction of the phases of the sub-beams generated by the beam emitting subsystems 12a, 12b and 12c (as described above with reference to FIG. 3). In other non-limiting implementations, the decoding module 204 can be implemented as a part of the control subsystem 23.

Note that although the encoding module 44 as illustrated and described herein includes a signal generator 46 for performing multiple functions, including functions for sequence generation, signal/waveform generation and modulation, each of those functions may be performed by a dedicated separate component (e.g., a sequence generator, signal generator, and modulator). Likewise, although the decoding module 204 as illustrated and described herein includes a signal generator 208 for performing multiple functions, including functions for sequence generation, signal/waveform generation and demodulation, each of those functions may be performed by a dedicated separate component (e.g., a sequence generator, signal generator, and a demodulator).

Figure 5:
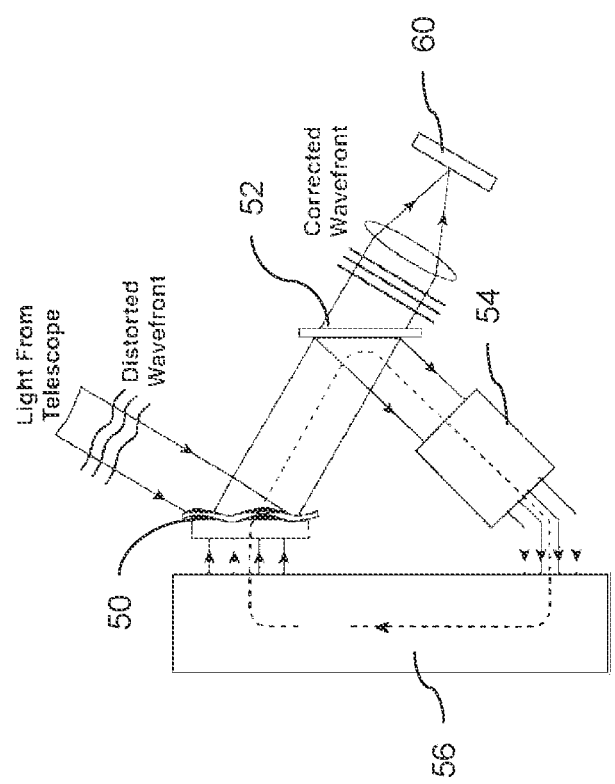
FIG. 5 illustrates schematically a telescope arrangement, such as the telescope of the receiver of FIG. 1, that includes adaptive optics for correcting wavefront distortions and images received via the telescope arrangement.

As mentioned above, in certain embodiments the optical arrangement (i.e., telescope 18) is integrated with an imaging system, which can be used for aiming each of the beam emitting subsystems 12a, 12b and 12c at the target spot. FIG. 5 schematically illustrates an adaptive optics arrangement for correcting distortions of an image received via a telescope. Light (i.e., radiation) collected by a telescope (not shown, but which can be the telescope 18) is reflected from an adaptive optical element, such as a deformable mirror 50, which typically has a reflective surface which can be selectively deformed by a plurality of actuators. The deformable mirror can be implemented using any suitable deformable mirror technology including, but not limited to, MEMS actuated mirrors, electrostatically actuated mirror membranes, piezoelectric actuated mirrors, and magnetic actuated mirrors. The light reflected by the deformable mirror is divided by a beam splitter 52, from which part of the light emerging from the beam splitter 52 passes to a wavefront sensor 54, such as a Shack-Hartman wavefront sensor, which measures distortion of the wavefront. A control system 56 analyzes the wavefront distortions that reach the wavefront sensor 54 and dynamically adjusts the deformable mirror 50 so as to reduce the wavefront distortions. The rest of the light emerging from the beam splitter 52 is directed towards an imaging system 60 (and/or other sensors). The components described with reference to FIG. 5, as well as the processing required to provide wavefront correction, are well known and can readily be implemented by a person of ordinary skill in the art.

Figure 6:
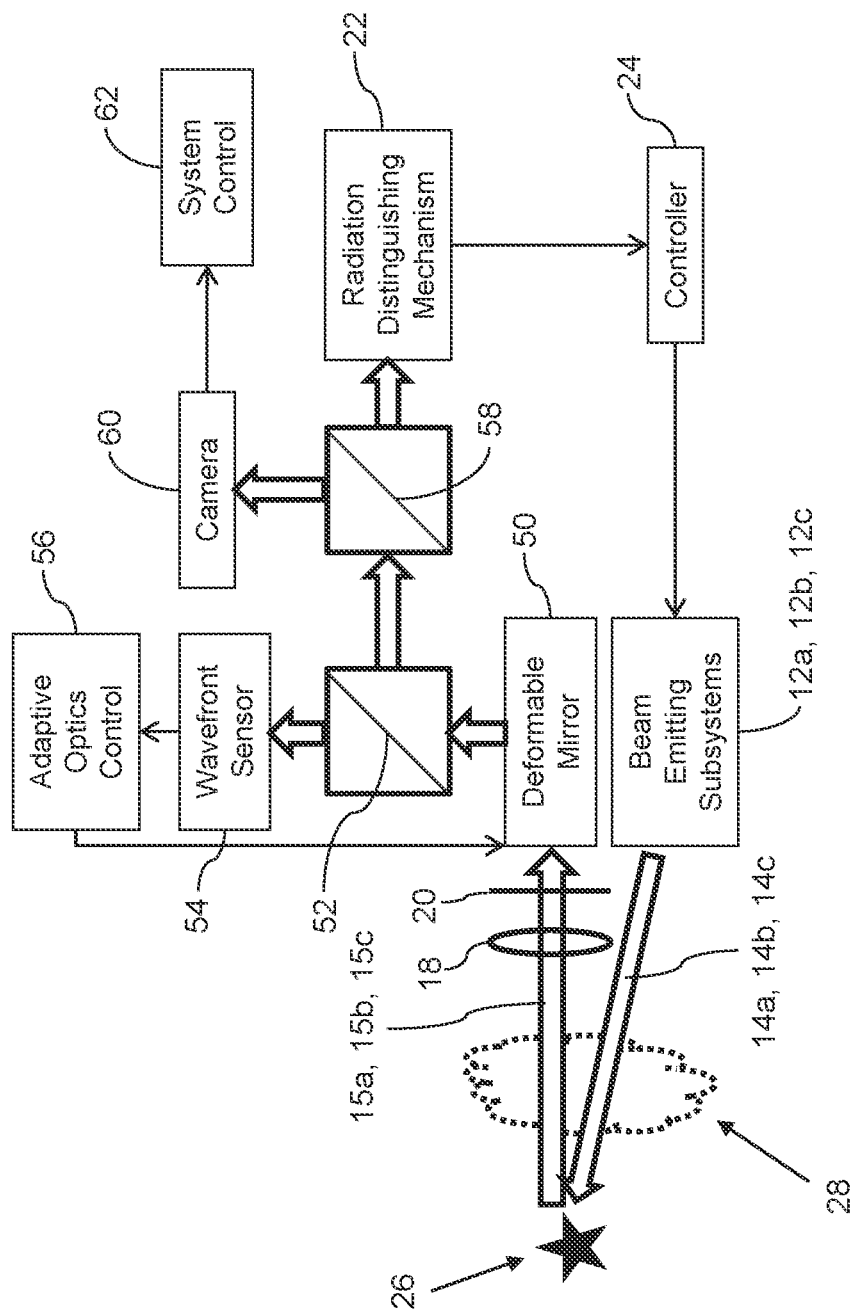
FIG. 6 is a schematic representation of a system integrating a telescope with adaptive optics into the receiver of FIG. 1.

FIG. 6 illustrates a particular implementation of an adaptive optics arrangement, such as the arrangement illustrated in FIG. 5, in the context of the multiple coherent beam combination (CBC) systems. Here, the adaptive optics arrangement is integrated as part of the targeting receiver described with reference to FIGS. 1, 3 and 4. The telescope arrangement 18 receives reflected light (i.e., radiation) from the target 26 that has passed through the medium 28 which introduces optical distortions. The light collected by the telescope 18 is spatially filtered by the spatial filtering configuration 20, and is directed from the deformable mirror 40 through the beam splitter 52 to the wavefront sensor 54, the output of which is processed by adaptive optics control system 56 to provide closed-loop feedback to adjust the deformable mirror 50, as described above with reference to FIG. 5. The rest of the light emerging from the beam splitter 52 passes to a second beam splitter 58, which directs part of the light to an imaging sensor (camera 60) and part of the light to the radiation distinguishing module 22, which distinguishes radiation intensity of each reflected radiation component. An overall control system 62 receives images produced by the camera 60 to control operation of the system, such as target selection, aiming correction, etc.

It is noted that the subdivision of the control systems into separate elements 24, 56 and 62 is shown here according to a functional subdivision. It should be noted however that these functions may be performed by processing systems or other logic circuitry hardware which can be subdivided in any desired manner, with one or more function being performed by a single processing system, or by a single function being performed by separate distributed processing systems. In some cases, certain processing and control functions may be performed remotely.

It should be noted that the two non-limiting implementations of the radiation distinguishing module 22 according to the embodiments presented herein have independent utility, such that the beam emitting subsystems and the control subsystem are not limited to use with a specific one of the radiation distinguishing modules 100, 200. It is further noted that each of the radiation distinguishing modules 100, 200 is most preferably implemented in combination with a battery containing between 10-30 beam emitting subsystems. In situations where it is desirable to use a battery containing more than 30 beam emitting subsystems, and up to several hundreds of beam emitting subsystems, the receiver 16 may be implemented so as to utilize the radiation distinguishing module 100 and the radiation distinguishing module 200 in parallel. In such embodiments, the light collected by the telescope 18 may be routed separately to the radiation distinguishing module 100 and the radiation distinguishing module 200, for parallel radiation distinguishing by the modules 100 and 200. The routing may be effectuated, for example, by a beam splitter (no shown) deployed in the optical path of the telescope 18 after the spatial filtering configuration 20.

As discussed above, the receiver 16 may deployed in various deployment configurations, so long as the receiver has line of sight with the target (i.e., can receive the radiation reflected from the target 26) and can support a low-latency data link to the beam emitting subsystems 12a, 12b and 12c. The receiver 16 is also generally smaller in size and of lower cost as compared to the beam emitting subsystems, and therefore there may be advantage in deploying multiple such receivers 16 at various respective positions (i.e., geographic locations). One advantage in deploying multiple receivers is the capability to utilize the output from the receiver that provides the best effective resolution of the target for performing additional functions (e.g., beam parameter adjustment for the beam emitting subsystems 12a, 12b and 12c).

There are several contributing factors that can be used alone or in combination in determining the effective resolution for a receiver-target pair. Such factors include, but are not limited to, the (linear) distance between the target and the receiver, the level of turbulence along the optical path from the target to the receiver, the aperture size of the receiver optics (telescope), and the line of sight stability between the receiver and the target. Estimation of the effective resolution can be performed based on images of the target produced by the receiver (for example produced by the camera and/or from known mission parameters and turbulence models, all as is known in the art. Determining which receiver provides the "best" effective resolution can be performed by comparing the estimates and identifying the receiver that produces the highest estimated effective resolution.

Figure 7:
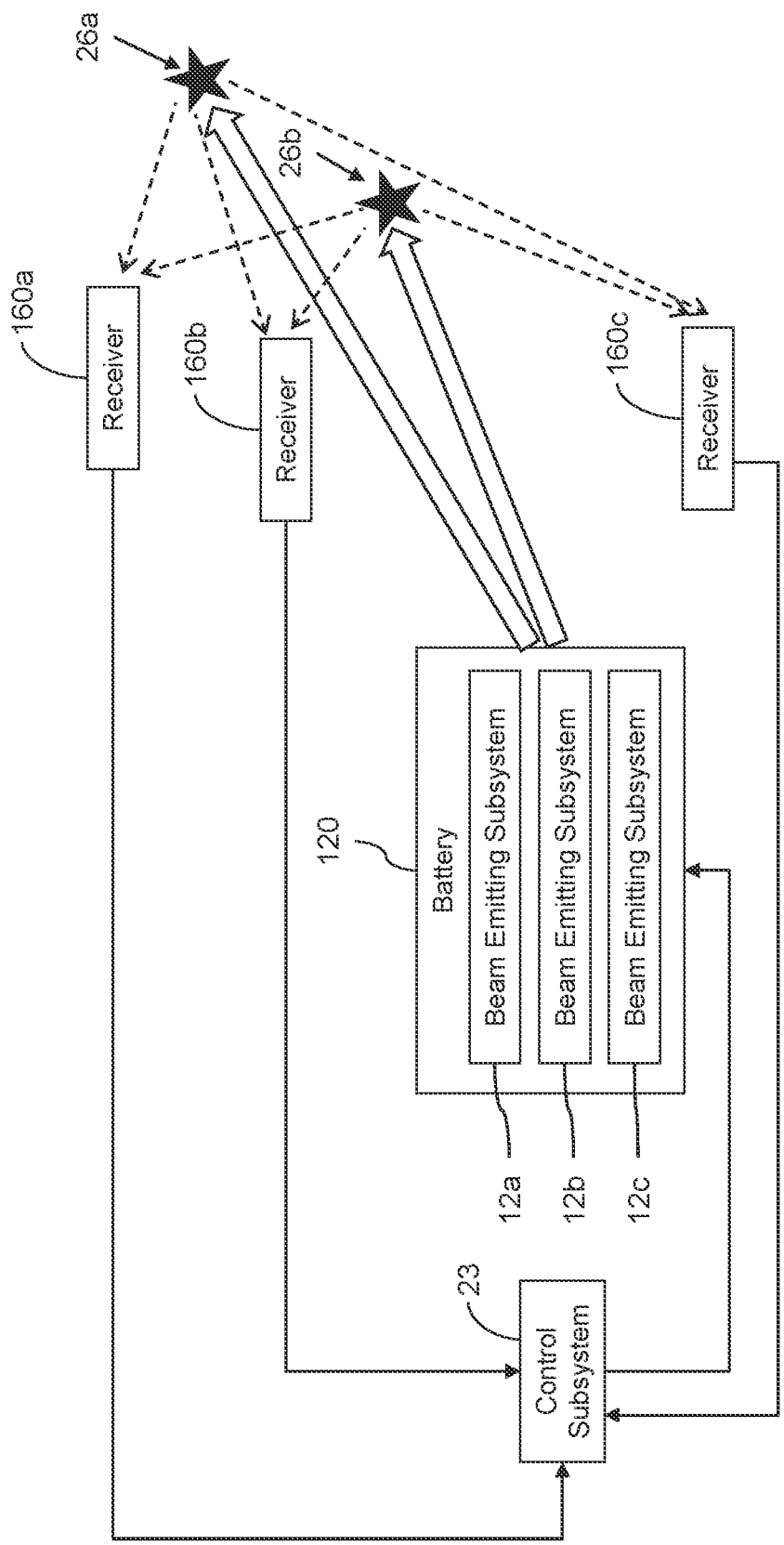
FIG. 7 is a schematic representation of a system having a plurality of beam emitting subsystems for transmitting beams and a plurality of receivers, each corresponding to the structure of the receiver of FIG. 1, according to an embodiment of the present invention.

FIG. 7 illustrates a non-limiting example deployment configuration for receivers in a system having three receivers 160a, 160b and 160c, each corresponding to the structure and operation of the receiver 16. In this non-limiting example configuration, the receivers 160a, 160b and 160c are deployed in different positions with respect to a battery 120 of beam emitting subsystems 12a, 12b and 12c and two targets 26a and 26b. Here, the composite output beams directed toward the targets by each of the beam emitting subsystems 12a, 12b and 12c are generally designated by the thick arrows, and the radiation reflected by the targets is generally designated by thin dashed arrows. Although only three receivers are illustrated, the present embodiments may be implemented with anywhere between 2 and several dozen receivers, most preferably between 2 and 10 receivers.

For each target that is illuminated by beam emitting subsystems 12a, 12b and 12c, the control subsystem 23, which is associated with each of the receivers 160a, 160b and 160c, is preferably configured to estimate the effective resolution for each receiver, and select the receiver that provides the best effective resolution (based on the effective resolution estimates). The control subsystem 23 is further configured to select the output signal(s), resultant from the radiation separation performed by the radiation distinguishing module 22 of the selected receiver, for subsequent processing in order to allow the beam emitting subsystems of the battery 120 to perform additional functions (e.g., adjusting beam parameters of the generated sub-beams by performing phase correction of the phases of the sub-beams generated by the beam emitting subsystems).

If/when the beam emitting subsystems of the battery 120 are aimed at a different target (e.g., switching from target 26a to target 26b), the control subsystem 23 re-estimates the effective resolution for each receiver, and then again selects the signal output from the receiver that provides the best effective resolution for the new target. In this way, the control subsystem 23 is able to dynamically switch between the receivers to select the output from the receiver that provides the best effective resolution for a particular target. It may be advantageous to switch between receivers during the engagement time on a single target if the selected receiver suffers a drop in effective resolution. Such drops may occur sporadically as the mission situation evolves since the engagement time on a particular target can last up to several seconds. In order to effectively switch receivers during the engagement time, the effective resolution for all of the receivers is preferably re-calculated at rapid cycles (e.g., 10 or more times per second) throughout the duration of the engagement time on the target. If the effective resolution of the selected target drops below a usability threshold, the control subsystem 23 may switch to a different receiver that has a higher effective resolution than the previously selected receiver.

It is noted that the radiation distinguishing module of the receivers 160a, 160b and 160c need not necessarily be implemented according to the same implementation. For example, the radiation distinguishing module of some of the receivers may be implemented as the radiation distinguishing module 100, while the radiation distinguishing module of the remaining receivers may be implemented as the radiation distinguishing module 200.

In addition, the control subsystem 23 may be configured to receive output signal(s) from receivers other than the selected receiver, and combine the output signal(s) provided by the selected receiver with output signal(s) provided by the additional receivers to form an aggregated (combined) output signal. This aggregated output signal can be subsequently processed in order to allow the beam emitting subsystems of the battery 120 to perform additional functions. The signals can be combined using various signal combining techniques, including, for example, weighted averaging techniques in which the signal from the receiver that provides the best effective resolution for the target is given the highest weight, and the signal from the receiver that provides the second best effective resolution is given the second highest weight, and so on. Preferably, the receivers that contribute to the aggregated signal are pointed at the same spot on the target with high precision, which could require a dedicated target tracking and aiming subsystem linked to the receivers and the control subsystem 23.

Figure 8:
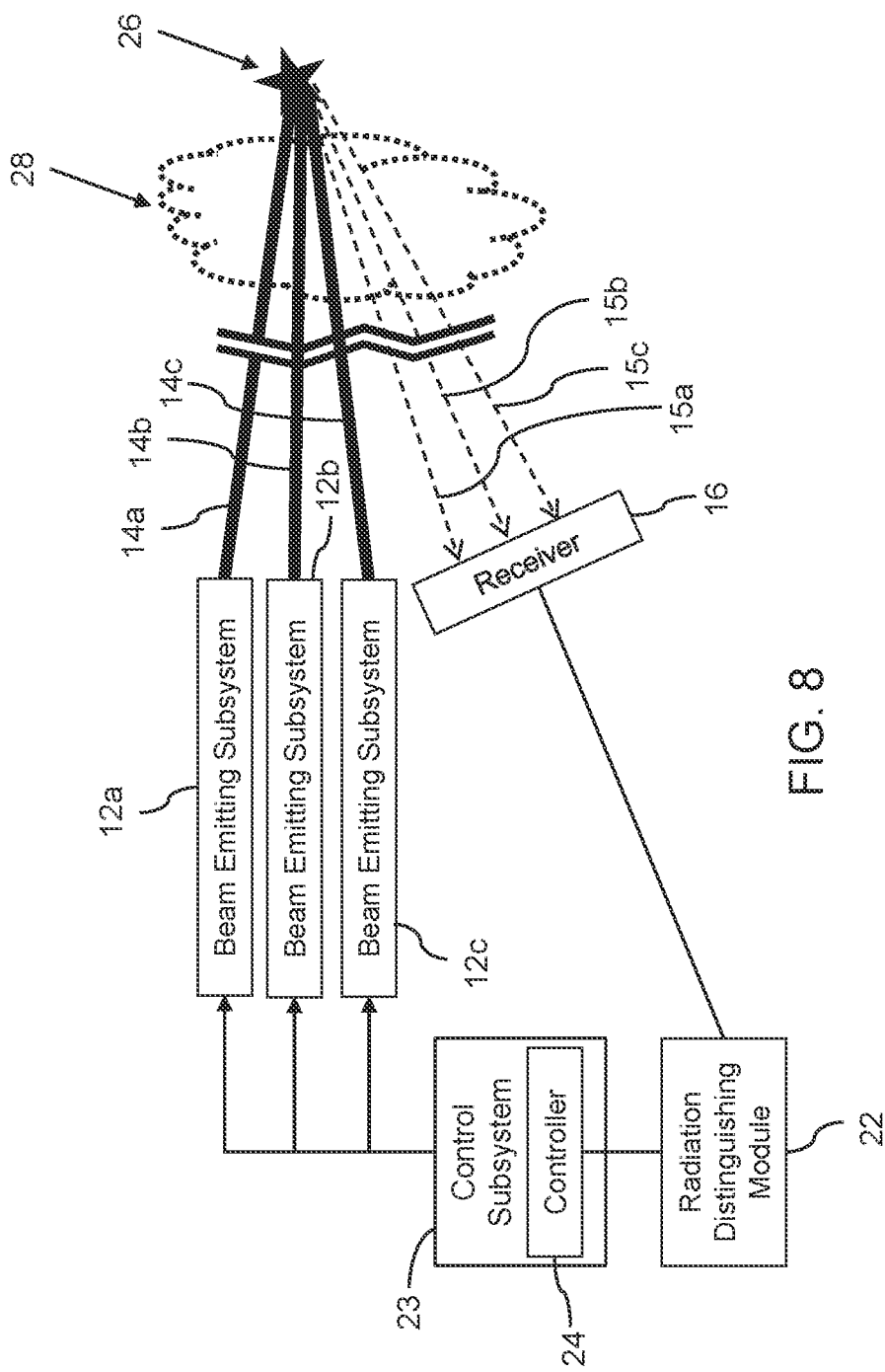
FIG. 8 is a schematic representation of a system, constructed and operative according to embodiments of the present invention, generally similar to the system of FIG. 1, but in which the radiation distinguishing module is separated from the receiver.

Although the radiation distinguishing module 22 has been predominantly described within the context of embodiments in which the radiation distinguishing module 22 is a part of the receiver 16, as mentioned above other embodiments are possible in which the radiation distinguishing module 22 is associated with, but separated from, the receiver 16. FIG. 8 illustrates one such embodiment, in which the radiation distinguishing module 22 is deployed between the receiver 16 and the control subsystem 23. In certain implementations, the radiation distinguishing module 22 may be implemented as a module of the control subsystem 23 that is deployed between the controller 24 and the receiver 16. Different coupling configurations between the radiation distinguishing module 22 and the receiver 16 are possible. For example, an optical fiber can be used to provide a coupling (connection) between the receiver telescope 20 and the radiation distinguishing module 22. The optical fiber additionally can be used to perform spatial filtering (thereby functioning as the spatial filtering configuration 20) of the radiation received by the telescope 18, such that the radiation distinguishing module 22 receives spatially filtered radiation directly from the telescope 20 via the (spatial filtering) optical fiber. In implementations in which the radiation distinguishing module 22 is implemented using decoding (as in the case of the radiation distinguishing module 200), a low-latency broadband data link can provide a coupling between the receiver 16 (which includes the photodetector 202 for generating encoded signals from the received radiation) and the radiation distinguishing module 22. In such implementations, the generated signal is transmitted from the receiver 16 to the radiation distinguishing module 22 over the low-latency link.

Figure 9:
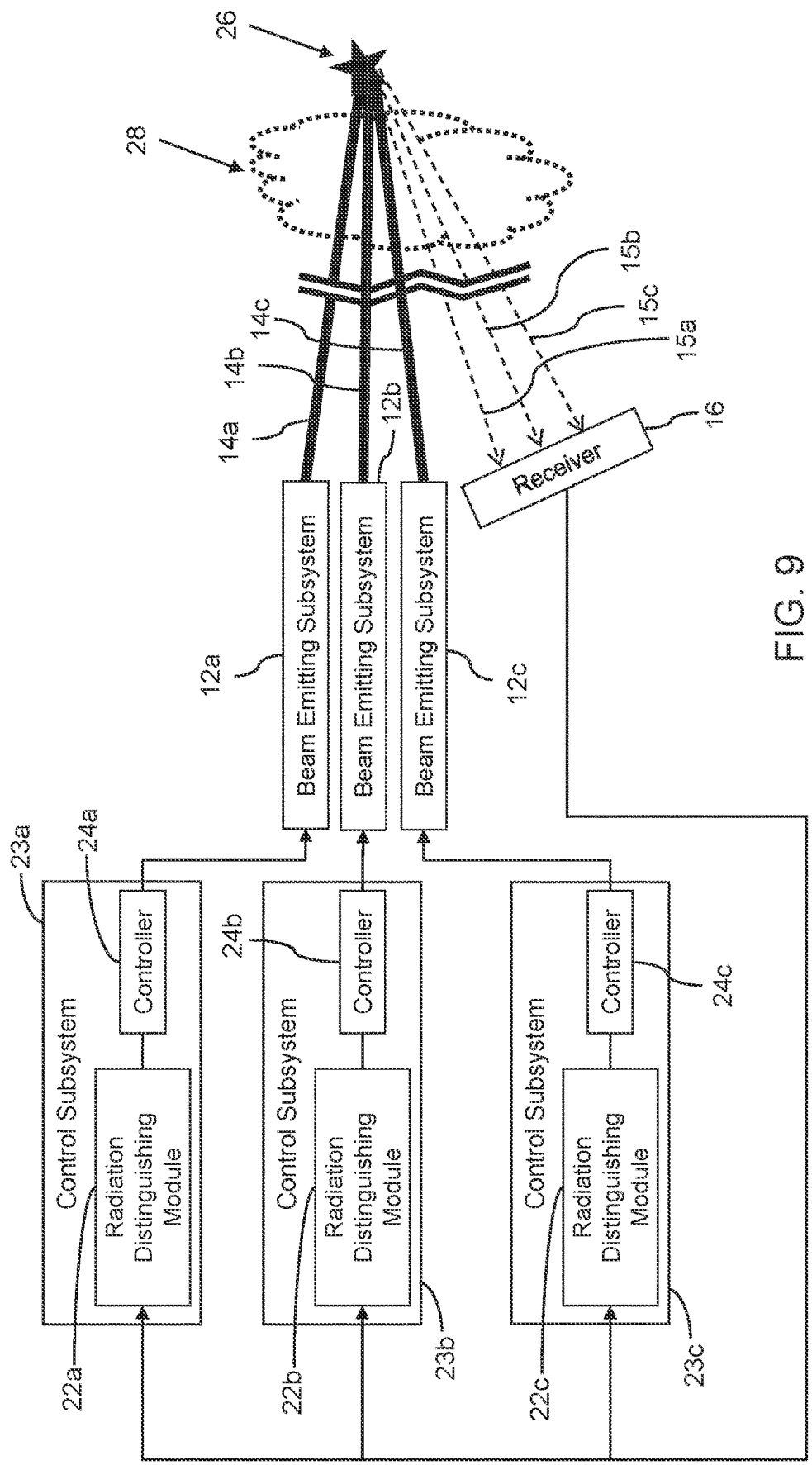
FIG. 9 is a schematic representation of a system, constructed and operative according to embodiments of the present invention, generally similar to the system of FIG. 8, but in which there are a plurality of radiation distinguishing modules, and each of the beam emitting subsystems is associated with a respective one of the radiation distinguishing modules.

The control subsystem 23 and radiation distinguishing module 22 configuration illustrated in FIG. 8 can be extrapolated to include configurations in which each beam emitting subsystem is associated with a respective control and radiation distinguishing subsystem. A non-limiting example of such a configuration is illustrated schematically in FIG. 9. Here, three radiation distinguishing modules 22a, 22b and 22c are deployed as part of three respective control subsystems 23a, 23b and 23c (having controllers 24a, 24b and 24c), which are associated with the respective beam emitting subsystems 12a, 12b and 12c. Although not shown in FIG. 9, the control subsystems 23a, 23b and 23c are preferably linked via a low-latency link, either directly or indirectly, and form an overall control subsystem of the system.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A system, comprising:
   a plurality of beam emitting subsystems for generating and transmitting a plurality of composite output beams toward an area of a target, each beam emitting subsystem configured to generate a plurality of coherent beams for directing towards the area of the target so as to combine at or before the target as a respective one of the composite output beams, wherein for each composite output beam of the plurality of composite output beams a proportion of radiation intensity of the composite output beam is reflected from the area of the target as a reflected radiation component, and wherein the plurality of composite output beams are incoherently combined;
   a telescope arrangement for collecting radiation reflected from the target and directing the reflected radiation onto a focal plane, the reflected radiation including a plurality of components of radiation, at least some of the components of radiation combining as a combined radiation composed of the reflected radiation components that reflected from the area of the target toward the telescope arrangement, and wherein an intensity of the combined radiation is indicative of radiation intensity of the composite output beams impinging on the target;
   a spatial filtering configuration deployed at the focal plane and configured for spatially filtering the reflected radiation by passing substantially only the combined radiation composed of the reflected radiation components that reflected from the area of the target toward the telescope arrangement;
   a radiation distinguishing module for receiving the combined radiation passed by the spatial filtering configuration and for distinguishing, for each reflected radiation component of the combined radiation, an intensity parameter of the reflected radiation component from an intensity parameter of the combined radiation of all other of the reflected radiation components of the combined radiation; and
   a control subsystem associated with the radiation distinguishing module and each of the beam emitting subsystems, wherein for each reflected radiation component the control subsystem is configured to:

receive the intensity parameter of the reflected radiation component from the radiation distinguishing module, and adjust a beam parameter of one or more coherent beams of the composite output beam corresponding to the reflected radiation component based on the received intensity parameter.

2. The system of claim 1, wherein each beam emitting subsystem includes:
a beam generating arrangement for generating the respective one of the composite output beams, and
a beam directing arrangement for directing the respective one of the composite output beams towards the target.

3. The system of claim 1, wherein each reflected radiation component has a different wavelength from all other of the reflected radiation component, and wherein the radiation distinguishing module includes:
an optics arrangement including at least one dispersive optical component for separating the combined radiation into a plurality of constituent wavelengths corresponding to the wavelengths of the reflected radiation component, and
a detector arrangement for receiving radiation separated by the at least one dispersive optical component, the detector arrangement configured to separately measure radiation at each respective wavelength of the constituent wavelengths.

4. The system of claim 3, wherein the at least one dispersive optical component includes a prism.

5. The system of claim 3, wherein the at least one dispersive optical component includes a diffractive grating.

6. The system of claim 3, wherein the optics arrangement further includes a collimating element deployed in an optical path between the spatial filtering configuration and the at least one dispersive optical component, the collimating element configured for: collimating the combined radiation so as to produce collimated radiation, and directing the collimated radiation to the at least one dispersive optical component.

7. The system of claim 3, wherein the detector arrangement includes an array of detectors, each respective detector of the array of detectors configured to measure radiation in a different respective wavelength of the constituent wavelengths.

8. The system of claim 1, wherein each beam emitting subsystem includes:
an array of beam sources configured to generate a plurality of coherent beams for directing towards the target so as to combine at or before the target as the respective one of the composite output beams,
a plurality of adjustable phase modulators associated with the beams sources so as to allow adjustment of relative phase offsets of the coherent beams, and
an encoding module for encoding a phase of each of the coherent beams with a code that is locally unique to the beam emitting subsystem.

9. The system of claim 8, wherein the radiation distinguishing module includes:
a detector deployed to receive the combined radiation and to monitor an intensity parameter of the combined radiation, and
a decoding module configured to decode, for each composite output beam, the intensity parameter of the combined radiation according to the locally unique code of the beam emitting subsystem that generated the composite output beam to isolate an intensity parameter of the reflected radiation component corresponding to the composite output beam.

10. The system of claim 9, wherein the encoding module includes a modulator, and wherein the code includes a modulation frequency such that each composite output beam is assigned at least one unique modulation frequency, and wherein the encoding module is configured to encode the phase of each of the coherent beams for each beam emitting subsystem by modulating the current phase of the coherent beams at the assigned at least one modulation frequency, and wherein the decoding module includes a plurality of demodulators, each demodulator configured to demodulate a signal corresponding to the intensity parameter at one or more selected demodulation frequency selected from the assigned unique modulation frequencies.

11. The system of claim 1, wherein each beam emitting subsystem includes:
an array of beam sources configured to generate a plurality of coherent beams for directing towards the target so as to combine at or before the target as the respective one of the composite output beams, and
a plurality of adjustable phase modulators associated with the beams sources so as to allow adjustment of relative phase offsets of the coherent beams.

12. The system of claim 1, further comprising:
an imaging system for generating images of the target, the imaging system including:
a wavefront sensor,
a deformable mirror for receiving radiation from the spatial filtering configuration,
a beam splitter for receiving radiation from the deformable mirror and providing a part of the received radiation to the wavefront sensor and providing another part of the received radiation to the radiation distinguishing module, and
an adaptive optics controller associated with the wavefront sensor operative to control the deformable mirror so as to reduce optical distortions in the reflected radiation collected by the telescope arrangement.

13. A system, comprising:
a plurality of beam emitting subsystems for generating and transmitting a plurality of composite output beams toward an area of a target, each beam emitting subsystem configured to generate a plurality of coherent beams for directing towards the area of the target so as to combine at or before the target as a respective one of the composite output beams, wherein for each composite output beam of the plurality of composite output beams a proportion of radiation intensity of the composite output beam is reflected from the area of the target as a reflected radiation component, and wherein the plurality of composite output beams are incoherently combined;
a plurality of receivers, each of the receivers configured to:
collect radiation reflected from the target and direct the reflected radiation onto a focal plane, the reflected radiation including a plurality of components of radiation, at least some of the components of radiation combining as a combined radiation composed of the reflected radiation components that reflected from the area of the target toward the receiver, and wherein an intensity of the combined radiation is indicative of radiation intensity of the composite output beams impinging on the target, spatially filter the reflected radiation at the focal plane by passing substantially only the combined radiation composed of the reflected radiation components that reflected from the area of the target toward the receiver, and receive the combined radiation that is spatially filtered and distinguish, for each reflected radiation component of the combined radiation, an intensity parameter of the reflected radiation component from an intensity parameter of the combined radiation of all other of the reflected radiation components of the combined radiation; and a control subsystem associated with the receivers and configured to:

select a selected receiver based on an estimate of an effective resolution of the target provided by each of the receivers, and actuate each of the beam emitting subsystems to adjust a beam parameter of one or more of the coherent beams based on the intensity parameters distinguished by the selected receiver.

14. A method, comprising:

transmitting a plurality of composite output beams toward an area of a target, wherein each composite output beam of the plurality of composite output beams is transmitted by generating a plurality of coherent beams and directing the coherent beams towards the area of the target so as to combine at or before the target as the composite output beam, wherein for each composite output beam of the plurality of composite output beams a proportion of radiation intensity of the composite output beam is reflected from the area of the target as a reflected radiation component, and wherein the plurality of composite output beams are incoherently combined;

collecting, by a telescope arrangement, radiation reflected from the target and directing the reflected radiation onto a focal plane, the reflected radiation including a plurality of components of radiation, at least some of the components of radiation combining as a combined radiation composed of the reflected radiation components that reflected from the area of the target toward the telescope arrangement, and wherein an intensity of the combined radiation is indicative of radiation intensity of the composite output beams impinging on the target;

spatially filtering the reflected radiation by passing substantially only the combined radiation composed of the reflected radiation components that reflected from the area of the target toward the telescope arrangement;

receiving the combined radiation passed by the spatially filtering, and distinguishing, for each reflected radiation component of the combined radiation, an intensity parameter of the reflected radiation component from an intensity parameter of the combined radiation of all other of the reflected radiation components of the combined radiation;

for each reflected radiation component, receiving by a control subsystem the distinguished intensity parameter of the reflected radiation component; and for each reflected radiation component, adjusting via the control subsystem a beam parameter of one or more coherent beams of the composite beam corresponding to the reflected radiation component based on the received distinguished intensity parameter of the reflected radiation component.

* * * * *